Jan. 26, 1965 R. P. TAYLOR ETAL 3,167,003

MULTIPLE FIELD PRINTING MECHANISM

Filed Jan. 30, 1964 13 Sheets-Sheet 1

INVENTORS
RICHARD P. TAYLOR &
WILLIAM C. PRESTON

BY Louis A. Kline
Richard W. Lavin
THEIR ATTORNEYS

INVENTORS
RICHARD P. TAYLOR &
WILLIAM C. PRESTON

BY Louis A. Kline
Richard W. Lavin
THEIR ATTORNEYS

Jan. 26, 1965 R. P. TAYLOR ETAL 3,167,003

MULTIPLE FIELD PRINTING MECHANISM

Filed Jan. 30, 1964 13 Sheets-Sheet 3

INVENTORS
RICHARD P. TAYLOR &
WILLIAM C. PRESTON

BY Louis A Kline
Richard W Lavin
THEIR ATTORNEYS

INVENTORS
RICHARD P. TAYLOR &
WILLIAM C. PRESTON
BY
Louis A. Kline
Richard W. Lavin
THEIR ATTORNEYS Jan. 26, 1965 R. P. TAYLOR ETAL 3,167,003

MULTIPLE FIELD PRINTING MECHANISM

Filed Jan. 30, 1964 13 Sheets-Sheet 5

INVENTORS
RICHARD P. TAYLOR &
WILLIAM C. PRESTON

BY

Louis A. Kline
Richard W. Lavin

THEIR ATTORNEYS

Jan. 26, 1965 R. P. TAYLOR ETAL 3,167,003

MULTIPLE FIELD PRINTING MECHANISM

Filed Jan. 30, 1964 13 Sheets-Sheet 6

INVENTORS
RICHARD P. TAYLOR &
WILLIAM C. PRESTON

BY

Louis A Kline
Richard W Lavin

THEIR ATTORNEYS

INVENTORS
RICHARD P. TAYLOR &
WILLIAM C. PRESTON

BY Louis A. Kline
Richard W. Lavin
THEIR ATTORNEYS

MULTIPLE FIELD PRINTING MECHANISM

Filed Jan. 30, 1964 13 Sheets-Sheet 8

INVENTORS
RICHARD P. TAYLOR &
WILLIAM C. PRESTON

BY Louis A. Kline
Richard W. Lavin
THEIR ATTORNEYS

INVENTORS
RICHARD P. TAYLOR &
WILLIAM C. PRESTON
BY Louis A. Kline
Richard W. Lavin
THEIR ATTORNEYS INVENTORS
RICHARD P. TAYLOR &
WILLIAM C. PRESTON
BY
Louis A Kline
Richard W Lavin
THEIR ATTORNEYS

INVENTORS
RICHARD P. TAYLOR &
WILLIAM C. PRESTON
BY
THEIR ATTORNEYS

INVENTOR
RICHARD P. TAYLOR &
WILLIAM C. PRESTONS
BY
THEIR ATTORNEYS

INVENTORS
RICHARD P. TAYLOR &
WILLIAM C. PRESTON
BY Louis A. Kline
Richard W. Lavin
THEIR ATTORNEYS United States Patent Office 3,167,003
Patented Jan. 26, 1965

3,167,003

MULTIPLE FIELD PRINTING MECHANISM

Richard P. Taylor, Xenia, and William C. Preston, Dayton, Ohio, assignors to The National Cash Register Company, Dayton, Ohio, a corporation of Maryland
Filed Jan. 30, 1964, Ser. No. 341,348
9 Claims. (Cl. 101—93)

This invention relates to an apparatus for encoding magnetic characters on a record medium or document and more particularly to an encoding apparatus capable of encoding magnetic characters in a plurality of predetermined areas of the record medium.

In modern banking operations, checks or other types of checking account media are imprinted in magnetic ink with information pertaining to the amount of the check, the account number of the payer, the Transit Routing number of the bank in which the account of the payer is located, the transaction code, and the serial number. The checks are then processed by mechanized check-handling equipment which utilizes magnetic ink character recognition as the basis of its operation.

In printing the above information on the checks, prior encoding apparatuses have been used which were capable of encoding only one of the above-mentioned informational fields disclosed above. Thus, in processing the checks, it was required to have a number of these encoding apparatuses, which entailed a large expense and which increased the chances for error due to the large amount of check handling that was required. In order to reduce these conditions and to increase the speed of processing the checks, it is a broad object of this invention to provide an encoding apparatus capable of encoding any number of information fields on a checking account medium with only one handling of such medium.

It is another object of this invention to provide an encoding apparatus having a mechanism which may be selectively operated to position the checking account medium for encoding of any of the above-mentioned informational fields.

It is still another object of this invention to provide an encoding apparatus capable of positioning a checking account medium for encoding of information where the medium is of a non-standard construction.

It is a further object of this invention to provide an encoding apparatus having controls which are presettable by the operator to control the encoding of the checking account medium in the manner described above.

With these and other, incidental, objects in view, the invention includes certain novel features of construction and combinations of parts, a preferred form or embodiment of which is hereinafter described with reference to the drawings which accompany and form a part of this specification.

Figure 19A:
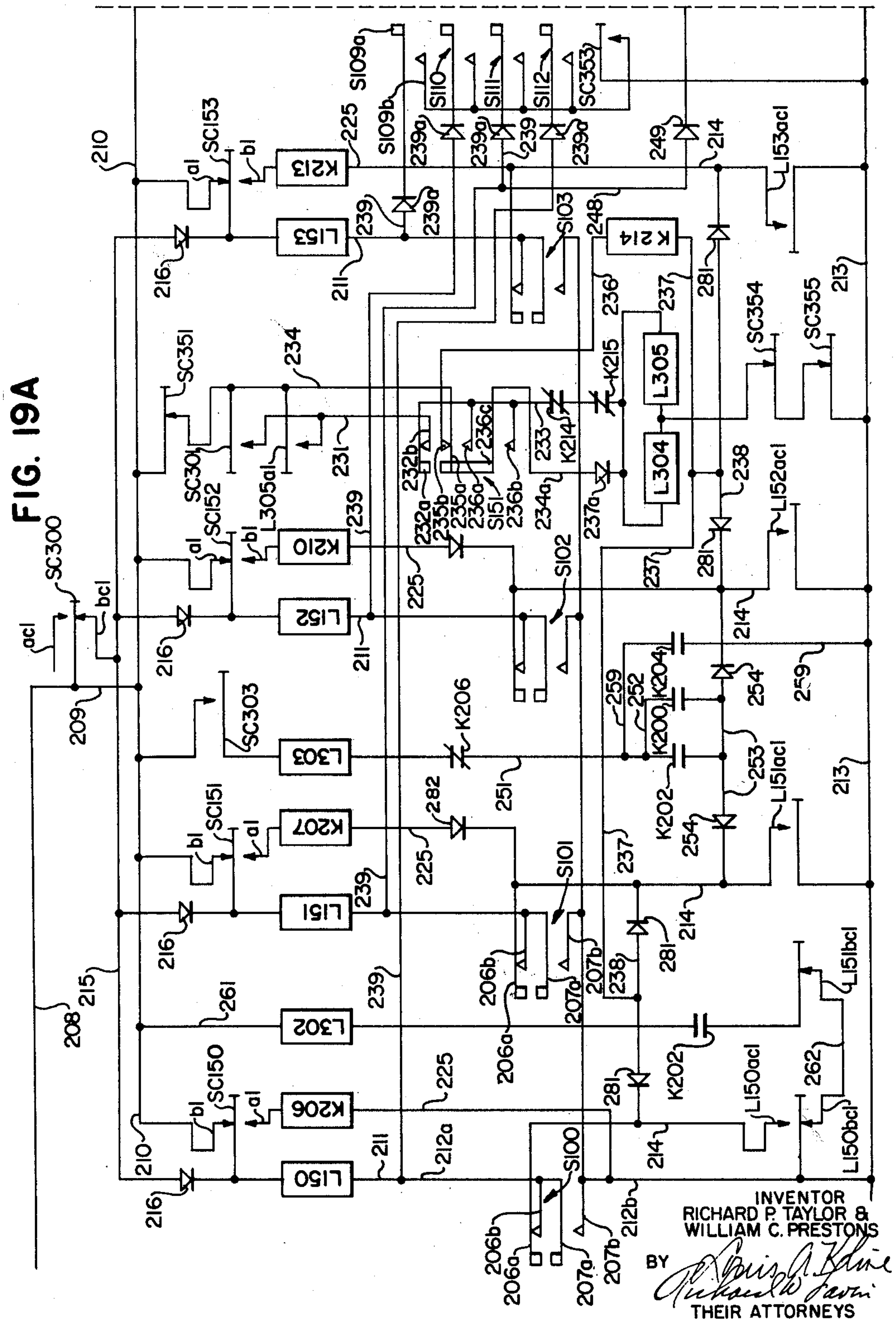
Figure 19B:
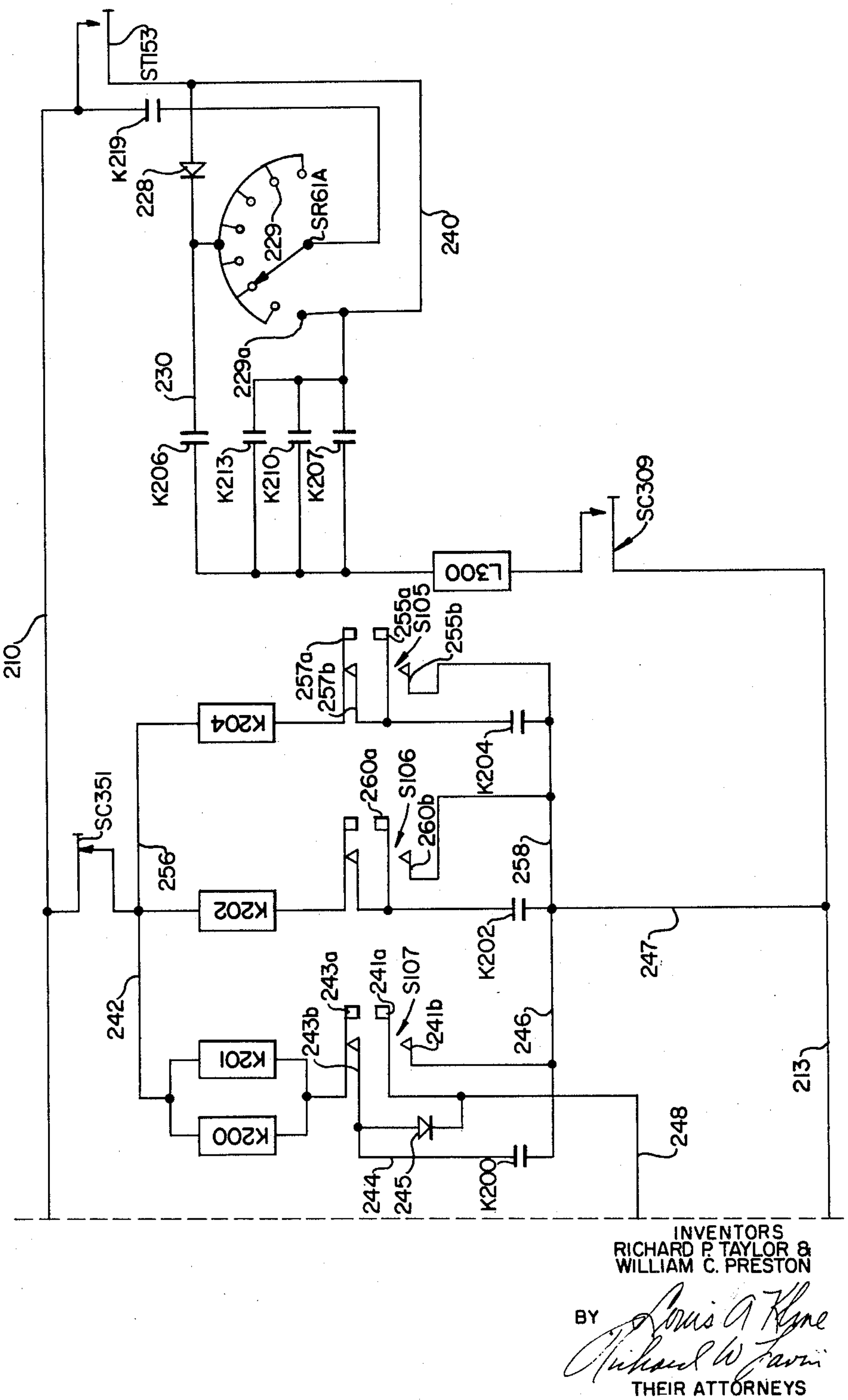

FIGS. 19A and 19B combined form a schematic representation of the electrical circuit used in controlling the operation of the apparatus disclosed herein.

Figure 20:
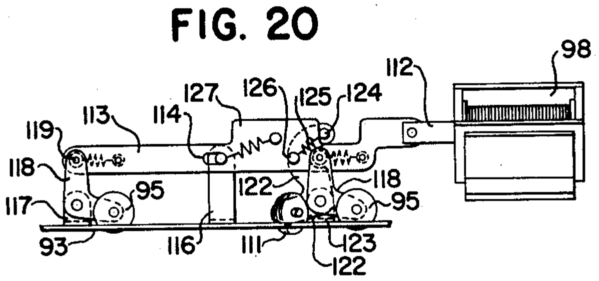
Figure 14:
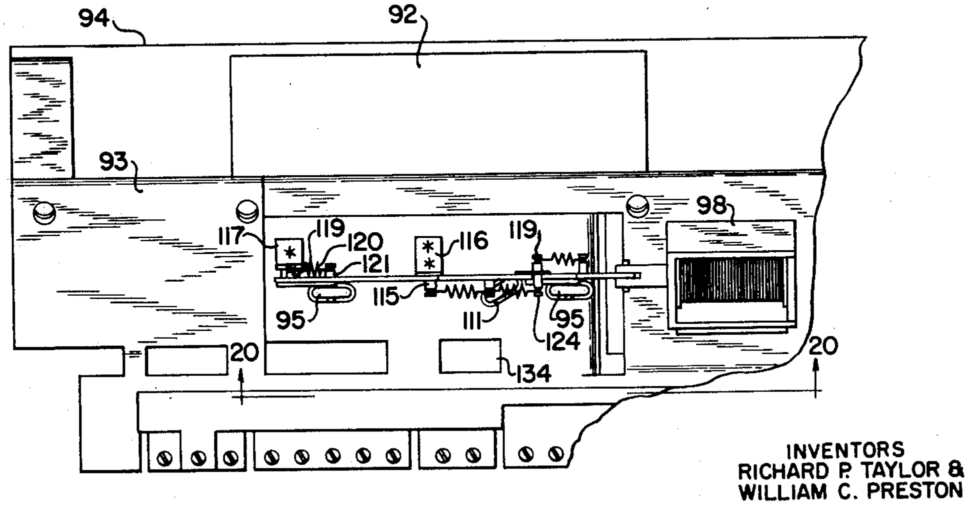
FIG. 14 is a partial top view of the slip table, showing the pressure-roller-actuating mechanism.

FIG. 20 is a detailed view of the pressure-roller-actuating mechanism taken along line 20—20 of FIG. 14.

*General construction*

Figure 1:
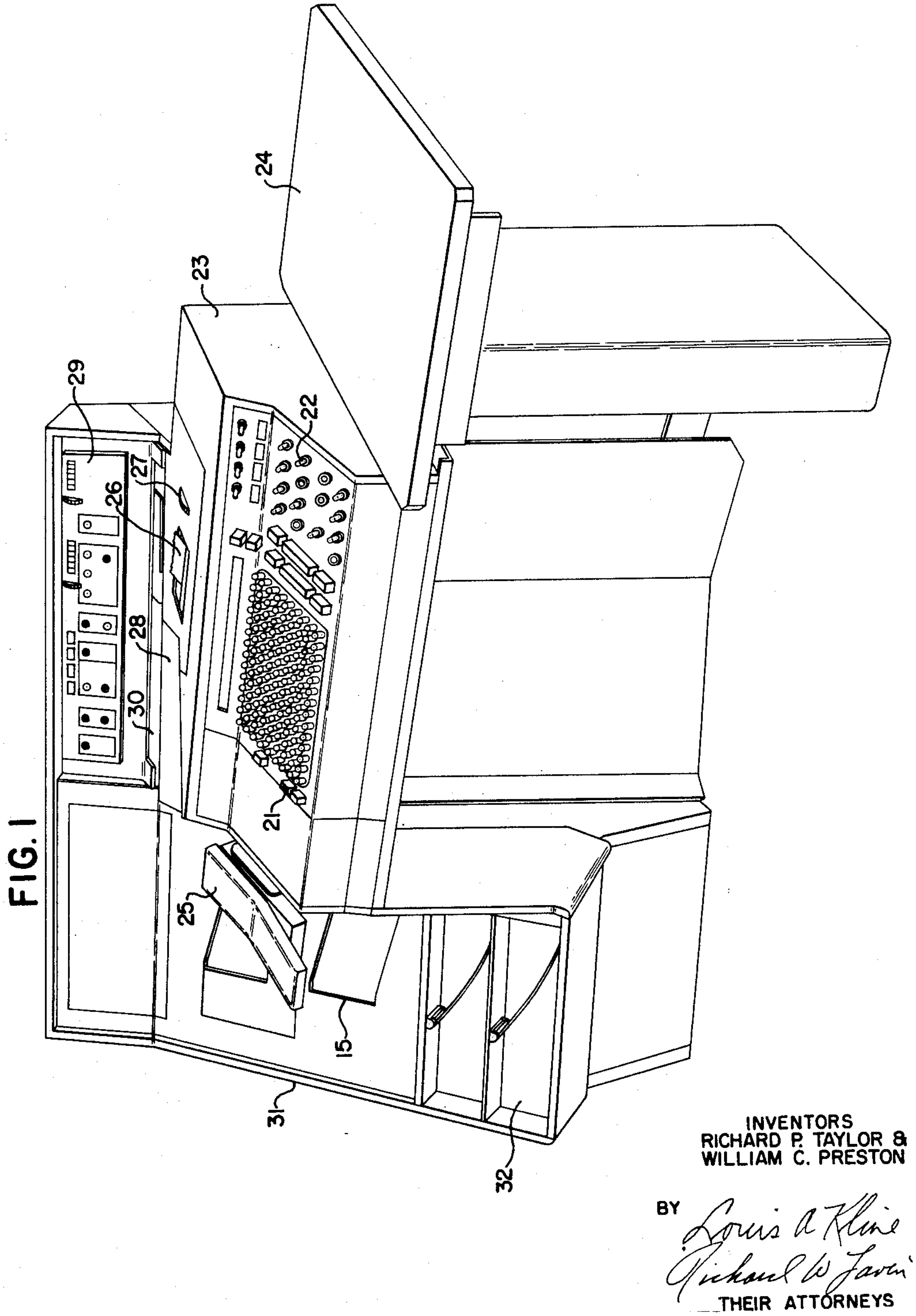
FIG. 1 is a perspective view of the encoding apparatus embodying the present invention.

The general arrangement of the encoding apparatus is shown in FIG. 1. The apparatus includes a keyboard 21, which is of an adding machine construction. The adding machine is of the type disclosed in United States Patents No. 2,692,726, issued to Nelson R. Frieberg et al. on October 26, 1954, and No. 2,985,364, issued to Roland G. Fowler et al. on May 23, 1961. Mounted adjacent the keyboard is the Master Program control panel 22, by which the operator is able to program the various printing operations that are required. Both the adding machine 21 and the control panel 22 are located in a console 23, to which are mounted a table 24 and an arm rest 25 for use by the operator.

Located on top of the console 23 are an audit record tape 26, a control knob 27 for the manual advancement of the record tape 26, and a media tray 28, in which are positioned the various media which are to be processed by the encoding apparatus.

Located at the rear of the console is an auxiliary control panel 29, at the base of which is located an item chute 30, into which are placed the media to be encoded.

Behind the right-hand portion of the auxiliary control panel is an encoding mechanism (not shown), the construction of which is fully disclosed in United States Letters Patent No. 2,935,935, issued to William C. Preston et al. on May 10, 1960. Media placed in the item chute 30 are transported to the right to encoding position. After the encoding operation has occurred, the media are transported to the left into either of two sort pockets 15, located in the sorting bin 31, where the media are stacked for further process by other equipment. The construction and operation of the sorting bin 31 are fully disclosed in United States Letters Patent No. 3,100,113, issued to John W. Bennett et al. on August 6, 1963. Located at the bottom of the sorting bin 31 are two other storage pockets 32, which may be used to store media taken from the sorting pockets 15.

Figure 15:
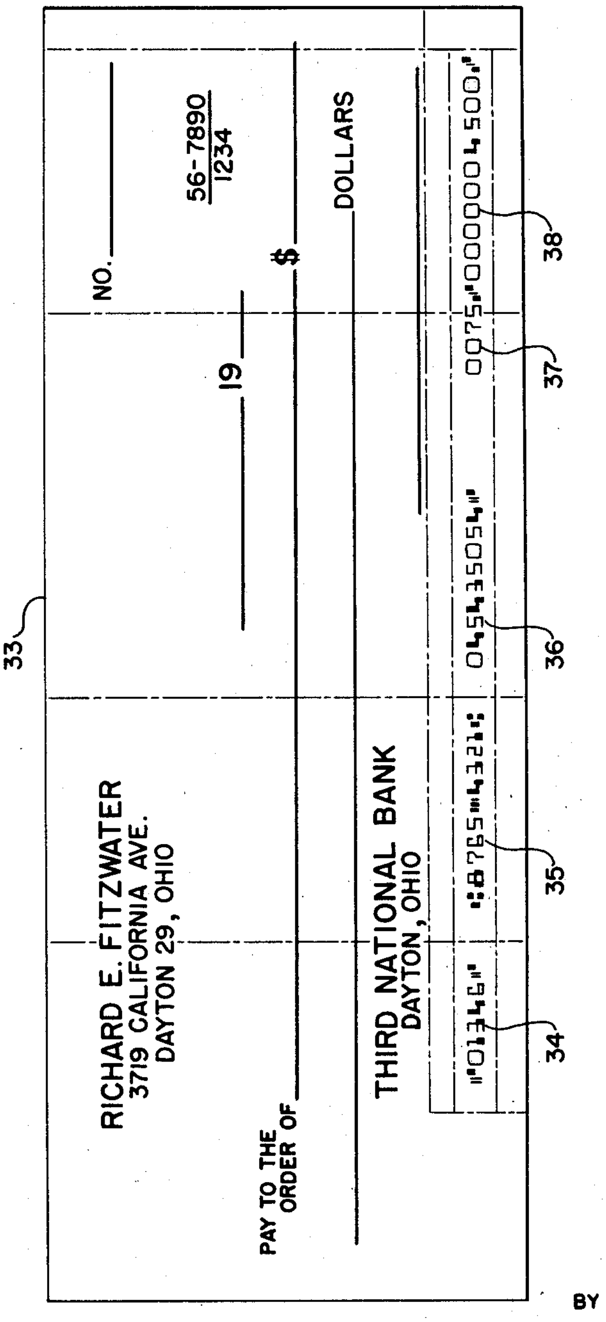
FIG. 15 is a plan view of a check, showing the position of the various informational fields.

The encoding apparatus disclosed herein is used principally to provide automated transit processing, customer "on-premise" encoding, and automated deposit proof of paper documents consisting primarily of checks and regular and "short-form" punched cards. As shown in FIG. 15, and as described previously, each check 33 is imprinted with magnetic characters and symbols in fields representing the Consecutive Numbers 34, the FR-ABA Transit Routing Number 35, the ON US ACCOUNT Number 36, and the combined Transaction Code 37 and Amount Number 38. Any of the above-mentioned fields or combinations thereof may be imprinted on the check during operation of the encoding apparatus in a manner to be described hereinafter.

Figure 16:
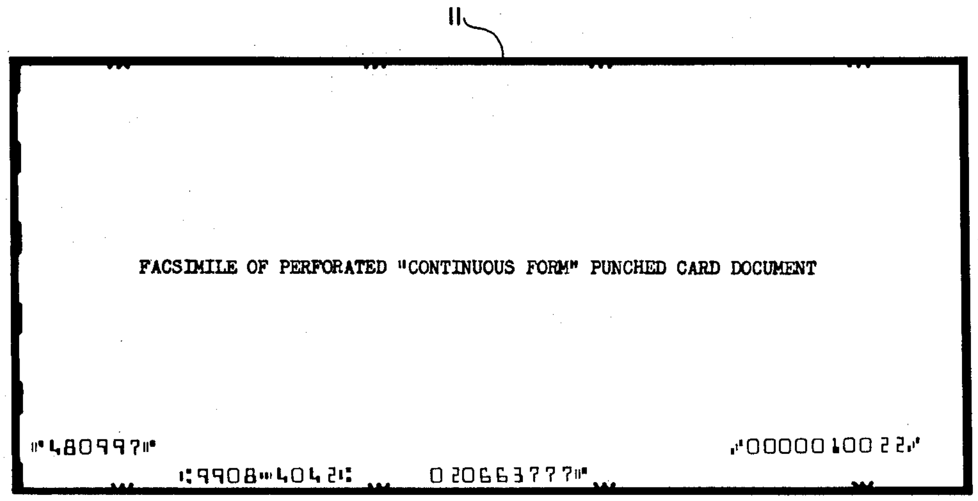
FIG. 16 is a plan view of a facsimile of a perforated "continuous form" punched card check, showing the position of the various informational fields.
Figure 17:
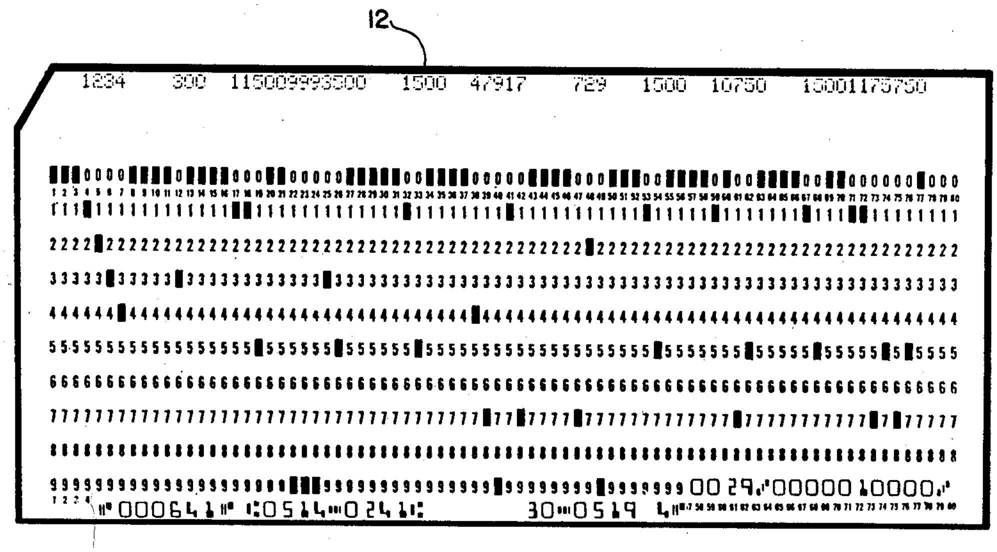
FIG. 17 is a plan view of a standard punched card check, showing the position of the various informational fields.

Many checks are in the form of punched cards, two examples of which are shown in FIGS. 16 and 17. The punched card 12 is of standard form, while the card 11 shown in FIG. 16 is of a "Continuous Form" format. These cards are based on the standard I.B.M. card system, which, when punched for the digit "9" located on the bottom level, interferes with the normal positioning of the informational fields. The encoding apparatus disclosed herein is capable of positioning all of the informational fields except amounts along the bottom edge of the card, as shown in FIG. 17.

Figure 18:
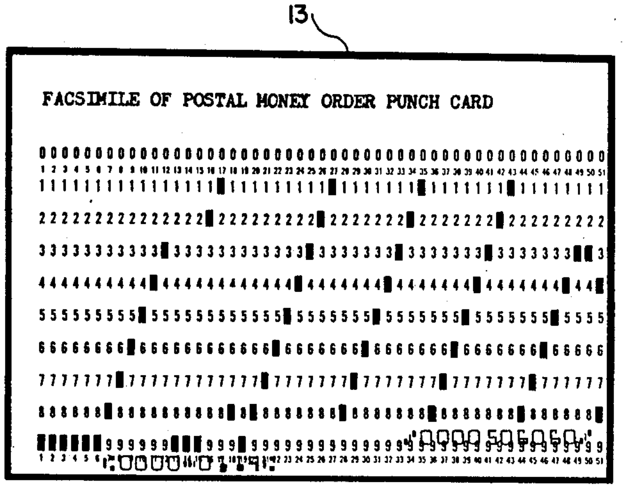
FIG. 18 is a plan view of a Postal Money Order, showing the position of the various informational fields.

Another form of media handled by the encoding apparatus are "short-form" documents which are too short in the horizontal plane for the amounts and the FR-ABA Transit Routing numbers to be encoded. FIG. 18 shows an example of this type of document, in this case a postal money order 13. The encoding apparatus in this instance will substitute the FR-ABA Transit Routing field in the position normally occupied by the Account Number field. This arrangement provides the ability to process postal money orders as transit items.

Figure 2:
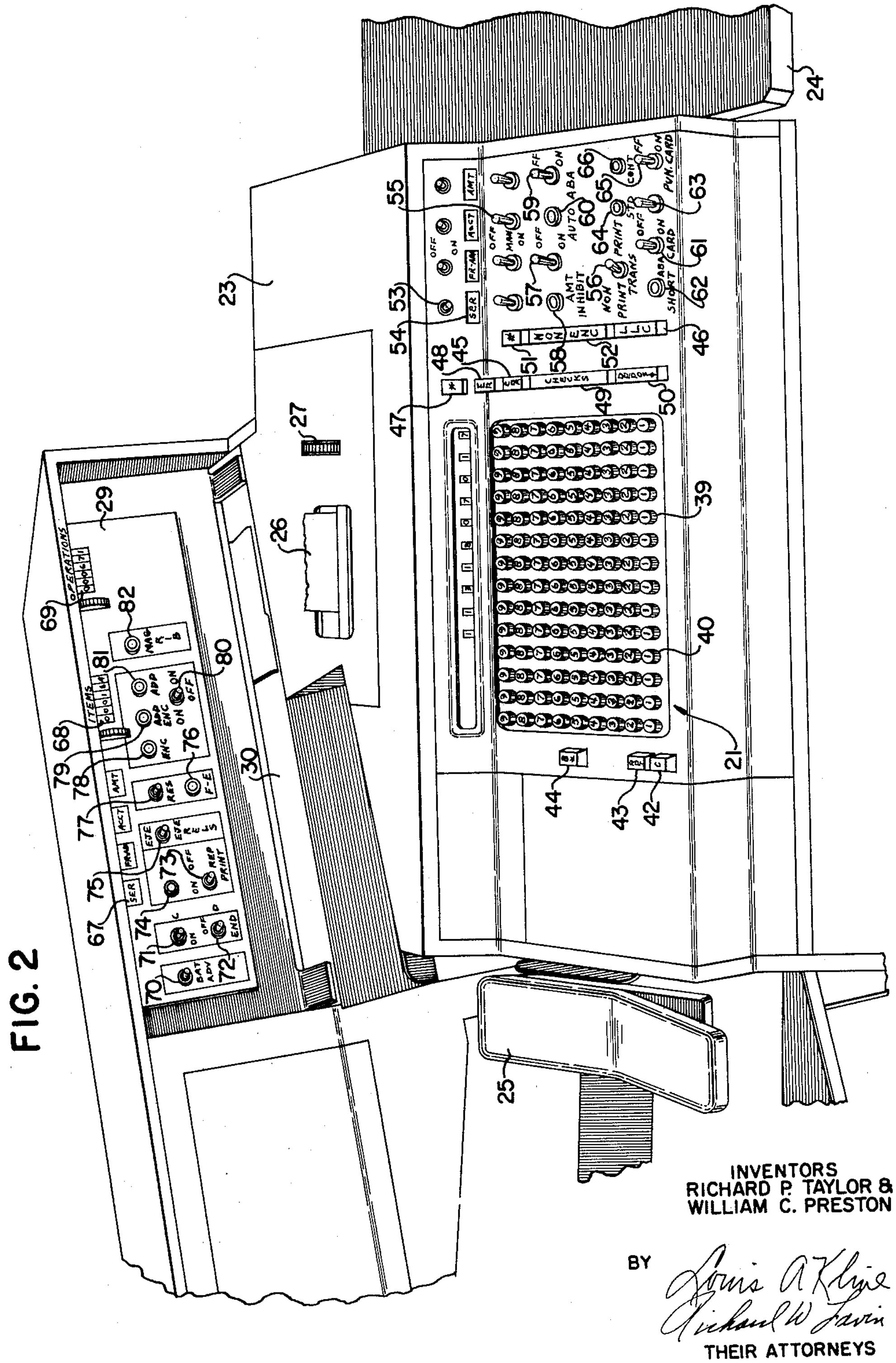
FIG. 2 is a detailed view of the keyboard, the Master Program Control panel, and the Auxiliary Control panel of the encoding apparatus.

Referring now to FIG. 2, there is shown a large schematic view of the keyboard, the Master Program Control panel, and the Auxiliary Control panel. The keyboard 21 consists of the first ten rows of amount keys 39, with the last four rows of keys 40 on the left-hand side of the keyboard for designating the Transaction Code. All of the rows of keys may be used in setting up the Account Number. The fifth row from the right side of the amount keys is ignored when the operator imprints the magnetic numbers in the FR-ABA Transit Routing field. The encoding unit is programmed to print a "dash" symbol in this position. The adding machine section is provided with an add-subtract totalizer and an accumulating totalizer. As part of the proof operation, amounts entered into the keyboard as deposits add to both totalizers. As checks are recorded, the amounts of the checks are subtracted from the add-subtract totalizer. Thus, as each amount of deposit is proved, the total deposit amount remains in the accumulating total, while the add-subtract totalizer is reduced to zero. If, at the end of the operation, the add-subtract totalizer is not at zero, a mechanism located in the adding machine will lock out the "Deposit" motor key from further operation, thus signalling the operator that a mistake has occurred. For a full disclosure of this lockout mechanism, reference should be made to United States Letters Patent No. 2,639,857, issued to Pascal Spurlino et al. on May 26, 1953.

Located above the keyboard 21 are a set of visible adding dials 41. As amounts are recorded, the net difference in the add-subtract totalizer is clearly visible to the operator. Located on the left hand end of the amount keyboard are three non-motorized control keys or bars. These include a "Clear" key 42, which restores any key depressed on the amount keyboard, a "Repeat" key 43, which, when depressed, prevents the adding machine mechanism from restoring the depressed Transaction Code keys when it is desired to repeat the Transaction Code entries from the keyboard, and the "Total" key 44, which, when used with the "T" key, to be described hereinafter, clears the total accumulation of deposits stored in the accumulating totalizer of the machine.

Located immediately to the right of the amount keyboard 21 is another set of motorized control keys or bars, which, when depressed, operate the adding machine. Included are two non-motorized control keys, the "Correction" key 45, which, when depressed and used with the "Check" key 49, adds the amount indexed on the keyboard into the add side of the add-subtract totalizer, and, when used with the "Deposit" key 50, subtracts the indexed amount from the add-subtract totalizer and the accumulating totalizer, this operation being the reverse of the normal "Deposit" key function; and the "Line-Lock Release" key 46, which releases the "Deposit" motor key for operation after the key had been locked up due to the failure of the add-subtract totalizer to be in a zero position at the end of a proof operation, as previously decribed.

The motorized keys include the "T" key 47, used with the "Total" key 44, described previously; The "Error" key 48, used to sub-total the add-subtract totalizer or the accumulating totalizer when used with the non-motorized "Total" key 44; the "Check" key 49 is used to record the amounts of the checks by entering the amount in the subtract side of the add-subtract totalizer and to print the amount on the record tape 26; the "Deposit" key 50, used to record the amounts of the checks by entering the amount in the add side of the add-subtract totalizer and in the accumulating totalizer and also to print the amount on the record tape 26; the "Number" key 51, used to record the Account Number, the FR-ABA Transit Routing Number, and the Serial Number on the record tape 26 and to encode these numbers on the documents or media which are to be encoded; and the "Non-Encode" key 52, which is used to subtract the amount set up on the keyboard from the add-subtract totalizer, print this amount on the record tape 26, and inhibit the encoding of the amount in the amount field while allowing the Transaction Code only to be encoded. Use of the "Non-Encode" key 52 prints the letter "N" on the record tape 26 for auditing purposes.

Located to the right of the above-described control keys is the Master Program Control panel. The basic function of this control panel is to select an encoding program for encoding a single or a plurality of media specimens. Located at the top of the panel are four Field Memory toggle switches 53, which, when moved to the lower, or ON, position, control a number of mechanisms, to be described hereinafter, to position the media for encoding the particular information represented by the toggle switch. Located beneath each toggle switch is a light 54, which is illuminated when an exit switch, described hereinafter, is actuated in conjunction with the operation of its associated toggle switch to indicate the type of information that is to be encoded. In a normal operation, the type of program will be selected before the processing of the media occurs.

Located beneath the lights 54 are a set of Momentary Select toggle switches 55, which, when actuated, momentarily select or interrupt the normal encoding of the informational field. If a particular field has been activated as a normal part of the operation, the encoding operation can be momentarily interrupted by moving the particular toggle switch 55 to the OFF, or upper, position, as shown in FIG. 2. Conversely, if a particular informational field has not been "programmed" by activation of its Field Memory switch as a normal part of the operation, this field can be momentarily activated by movement of the toggle switch 55 to the ON position. Encoding is then made by a control key operation in a particular field not normally used in the proof operation then being processed. This operation is contrasted with the continuous encoding operation undertaken when the programs are selected by the Field Memory toggle switches 53.

Located beneath the Momentary Select toggle switches 55 on the control panel are a number of toggle switches and their associated indicator lights, which provide control over the encoding operation to meet special conditions which arise during a proof operation. Included is a condition where a document is being processed that has the amount field pre-encoded, but where the operator desires to encode a transaction code number in front (to the left) of the amount. To imprint a Transaction Code in front of a pre-encoded amount field requires the imprinting of the amount field to be inhibited. This is necessary, since the Transaction Code is normally imprinted as a by-product of the amount field imprinting. An example of this is the bank's own Cashier's Check or a check that has been certified by the bank. Movement of the Transaction Code toggle switch 56 to the right or print position, together with the use of the Non-Encode key 52 on the adding machine keyboard, inhibits the encoding of the amount on the document, while allowing the Transaction code to be encoded. However, if the operator cycles the adding machine as though the amount field is to be imprinted, and then discovers that the field is pre-encoded, the Amount Inhibit toggle switch 57 is moved to the ON position. This inhibits the printing of the amount on the document, while allowing the Transaction Code to be encoded. The amount is recorded on the record tape 26 and subtracted from the add-subtract totalizer. Movement of the switch 57 to the "Non-Print" position disables the function of the "Non-Encode" key 52 and allows the amount to be encoded. Movement of the Transaction Code switch 56 to the "Non-Print" position inhibits the encoding of the Transaction Code. A lamp 58, associated with the Amount Inhibit toggle switch 57, lights at any time that the toggle switch 57 is moved to the ON position or the Non-Encode key 52 is depressed.

Whenever the bank is processing a check which is drawn on its own assets and the bank's own FR-ABA number has not been previously encoded on the document, movement of the Auto ABA toggle switch 59 to the ON position automatically encodes the bank's own transit number on the document without the number's being indexed on the keyboard. When this occurs, a lamp 60 lights and remains lit until the field has been encoded and the document has been ejected from the encoding unit.

In the case where postal money orders or other "short-form" documents (FIG. 18) are being processed, movement of the Short Card toggle switch 61 to the ON position controls the apparatus to automatically print the FR-ABA number in the area below the nine's row in the position that has been normally designed for the Account Number. In this case, the FR-ABA number must be indexed by the operator in the keyboard. An associated indicator lamp 62 lights when the Short Card switch 61 is actuated.

In handling checks or other documents which use the format of the punched card, a classification is made as to whether the punched cards are of a standard type (FIG. 17) or of a continuous form check (FIG. 16). Where the punched card check is of a standard format, movement of the Standard Card toggle switch 63 to the ON position conditions the machine to encode all the informational fields except the "Amount-Transaction Code" field in a position below the nine's row of the punched cards. Actuation of the toggle switch 63 illuminates its associated lamp 64. When the punched card check is of a continuous form, movement of the Continuous Form toggle switch 65 to the ON position conditions the machine to encode the Transit Number and the Account Number fields below the nine's row and the Transit Number and Serial Number seven sixteenths of an inch to the left of the normal field encoding position. This eliminates the various fields' being in contact with the continuous-form perforations along the bottom edge of the card. Actuation of the switch 65 lights the associated lamp 60.

In addition to the Master Program Control panel 22, there is also the auxiliary panel 29 (FIG. 2), located at the rear of the console and containing additional control switches, which will now be described. Along the top and left-hand side of the control panel, there are four lights 67, which are synchronized with the four signal lights 54 on the Master Program Control panel. They are placed in this control panel because the operator's glance can perceive these field lights more readily than those lights on the keyboard console, thus providing an additional convenience for the operator. In the top right-hand side of the control panel are two item counters. These are resettable and are changed daily to provide production counts for the operators. The Item counter 68 advances "1" each time an item is processed from printing table chute to storage bins. The Operations counter 69 is always equal to, but more often greater than, the "Item" counter. This counter advances "1" each time an encoding operation is made in fields selected. This counter compensates for variances in the item count among the operators. One operator may have a lower item count than another operator, but could have a higher operation count. This means that the operator recorded information in more fields than the second operator.

Located on the left-hand side of the control panel is the "Batch Advance" toggle switch 70, which, when actuated, advances the Batch Number one digit at a time. The Batch Number printing unit is located in an endorsing mechanism (not shown) located in the Storage and Sorting bins 31. Next to the Batch Advance Toggle switch are the Endorsement Control switches 71 and 72. These switches control the endorsement of the items as they pass from the printing table chute 30 to the endorsing mechanism (not shown) in the storage bin 31. The next control switch is the "Repeat Print" toggle switch 73, which, when used with the Auto ABA switch 59, encodes the Account number set up in the keyboard and the FR-ABA fields in one handling of the item. When the "Repeat Print" switch 73 is moved to the left, or ON, position, an associated lamp 74 is illuminated. Under this condition, an account number or any other number may be retained on the keyboard after once being indexed. Activation of the Auto ABA switch 61 introduces, automatically, the bank's own FR-ABA number in the proper encoding sequence, as described previously.

In the case where the document has been encoded and has not reached the storage pocket within the allotted time, a "Feed Error" lamp 76, which is normally illuminated by the document's activating an exit switch (not shown) in the check bin 31 and extinguished by a switch located in the sorting pocket 15, remains on, and, after the encoding of the first field of the next document, the system is locked up. After the jammed document has been cleared, the single-action "Feed Error Reset" switch 77 is actuated, provided that the document in the encoding station requires an additional field, or fields, of encoding. This releases the locked-up condition and allows the encoding operation to continue. If the document in the encoding station does not require additional encoding, movement of the "Eject Release" switch 75 to the upper, or Eject, position causes the document to be ejected and the locked-up condition to be released. If the document is torn or mutilated in such a manner that the eject mechanism cannot transport it to the check bin, movement of the "Eject Release" switch to its lower position eases the gripping action of the eject mechanism, allowing the operator to pull the document from the item chute. The Reset switch 77 is then activated to restore the electrical circuitry for resumption of a normal operating procedure.

Located to the right of the Reset switch 77 and the Feed Error lamp 76 are three signal lights, which identify the operating function of the machine at any given time. The first light is the "Encode" light 78, which, when lit, signifies that an operation has been recorded in the adding unit but the document has not yet been encoded by the machine. The next light is the "Add and Encode" lamp 79, which is illuminated when an associated Mode toggle switch 80 is actuated. The toggle switch 80 is the main power control switch and has three positions. When the toggle switch is in the center position, the power to the adding machine and the encoding apparatus is off. When the toggle switch is positioned to the left, power is provided to both the encoder and the adding unit. It is under this condition that the Add and Encode lamp is illuminated. If the toggle switch 80 is moved to the right, power is provided to the adding unit only. When this occurs, an "Add" lamp 81 is illuminated. To the right of the add lamp 81 is the "Magnetic Ribbon" lamp 82, which, when illuminated, indicates to the operator that the magnetic ribbon used in printing by the encoding mechanism has become exhausted or has broken. The machine is conditioned to stop operating when this occurs.

As described previously, located above the keyboard of the adding unit in the console is a record tape 26. All amounts of deposits (credits) and checks (debits) are recorded in original print on this tape and itemized in chronological sequence. A detailed, visible "audit trail" is thus provided. With this tape, the recording of the amount of each item can be checked back with the amount shown on each original document, or with the listing made by a depositor on the deposit slip at any given moment. It is thus seen that the operator is provided with sufficient controls to anticipate any problem which might be met in the processing of the various types of documents during a proof operation.

*Detailed description*

Figure 3:
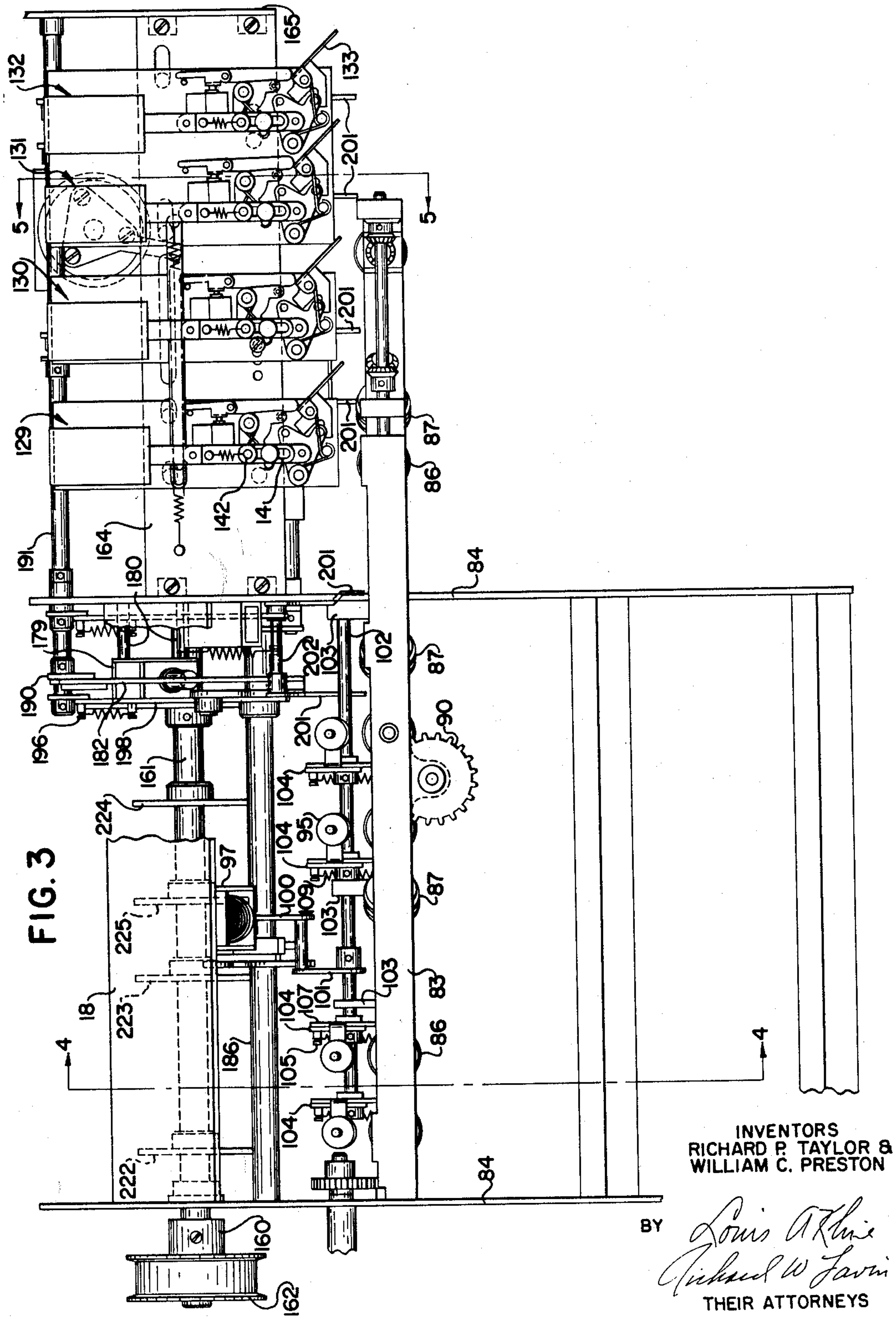
FIG. 3 is a partial detailed view of the media stop assemblies, the cam line, and the drive and pressure rollers of the check or media transport mechanism.
Figure 9:
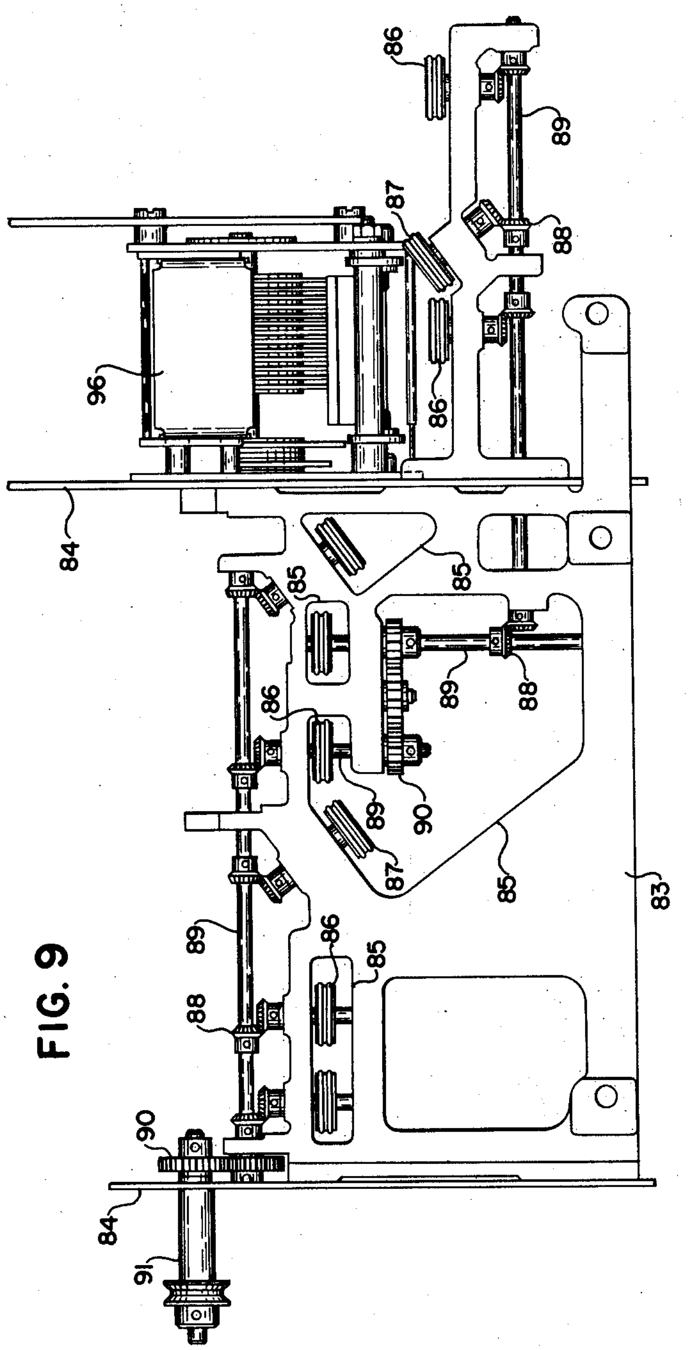
FIG. 9 is a top view of the feed bed, showing the drive rollers and their supporting structure.

FIGS. 3 and 9 show a detailed view of the check feed bed and the control stops for positioning the checks for an encoding operation. The feed bed frame 83 is secured to side frames 84 of the main console. As shown more clearly in FIG. 9, the feed bed frame 83 has a number of cut-out portions 85, in which are located a series of feed drive rollers. One set of drive rollers, 86, rotate counter-clockwise as viewed in FIG. 3. A second set of drive rollers, 87, are offset to the first set of drive rollers and are rotated clockwise. Each of the drive rollers is rotatably supported within the bed frame 83. It is also seen from FIG. 9 that each of the drive rollers is driven off a beveled gear 88, which is secured to a gear shaft 89. There are four such gear shafts rotatably mounted within the bed frame, each being interconnected by a bevel gear 88 or by a gear train 90, the system being driven by a power drive shaft 91. The drive shaft 91 is driven by a motor (not shown) located in the sorting bin 31.

Secured to the feed bed frame 83 is a slip table 92 (FIGS. 4, 5, and 14), which consists of an upper frame 93 and a lower frame 94 forming a throat into which the media are placed by the operator. Associated with each of the feed rollers 86, 87 is a pressure roller 95, 111, respectively (FIGS. 3 and 14), which, when actuated, forces the media located on the slip table into engagement with its associated pressure roller for transporting the media. The drive rollers 87, which are offset as shown in FIG. 9, drive the media into a position adjacent to the printing mechanism, part of which is shown in FIG. 9 and indicated as 96. As previously disclosed, the printing mechanism is fully disclosed in United States Letters Patent No. 2,935,935, issued to William C. Preston et al. on May 10, 1960.

The remaining drive rollers 86, which are located in a horizontal plane in FIG. 9, together with their pressure rollers, transport the media from the printing mechanism to the storage bin 31 in a manner which will now be described.

Figure 4:
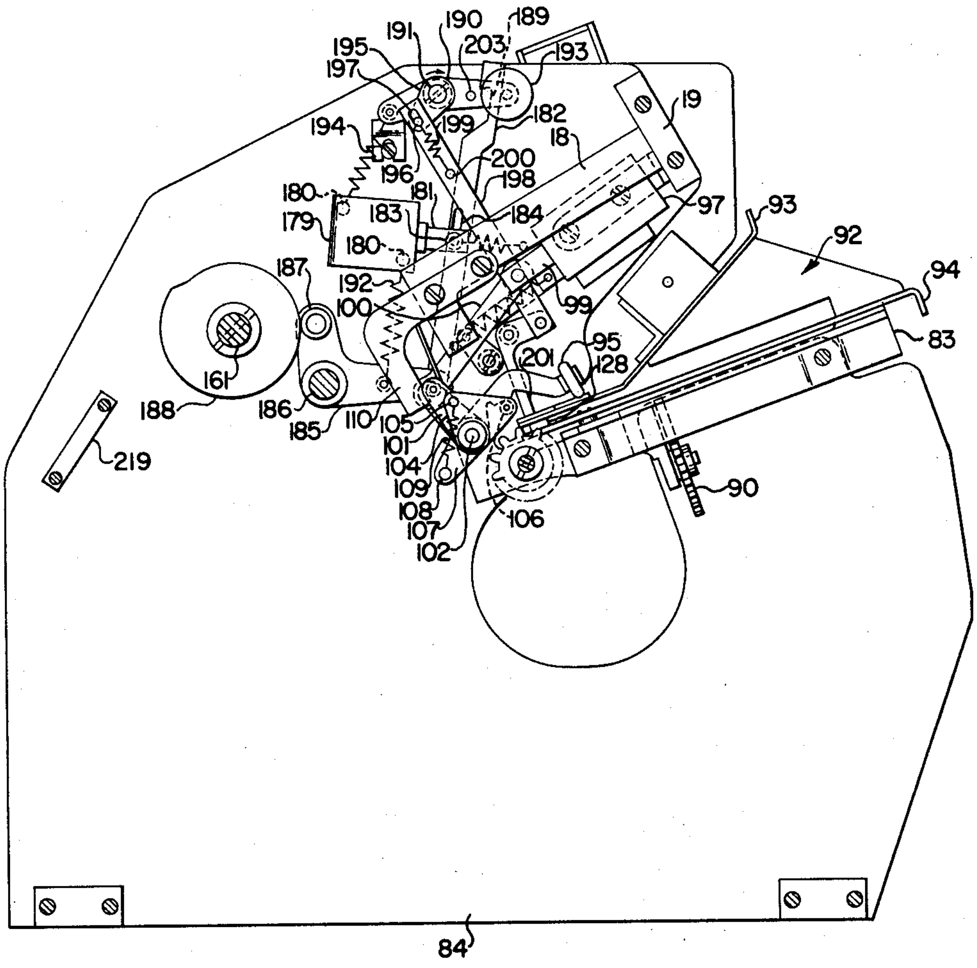
FIG. 4 is a sectional view taken along the line 4—4 of FIG. 3, showing the print drop mechanism.
Figure 5:
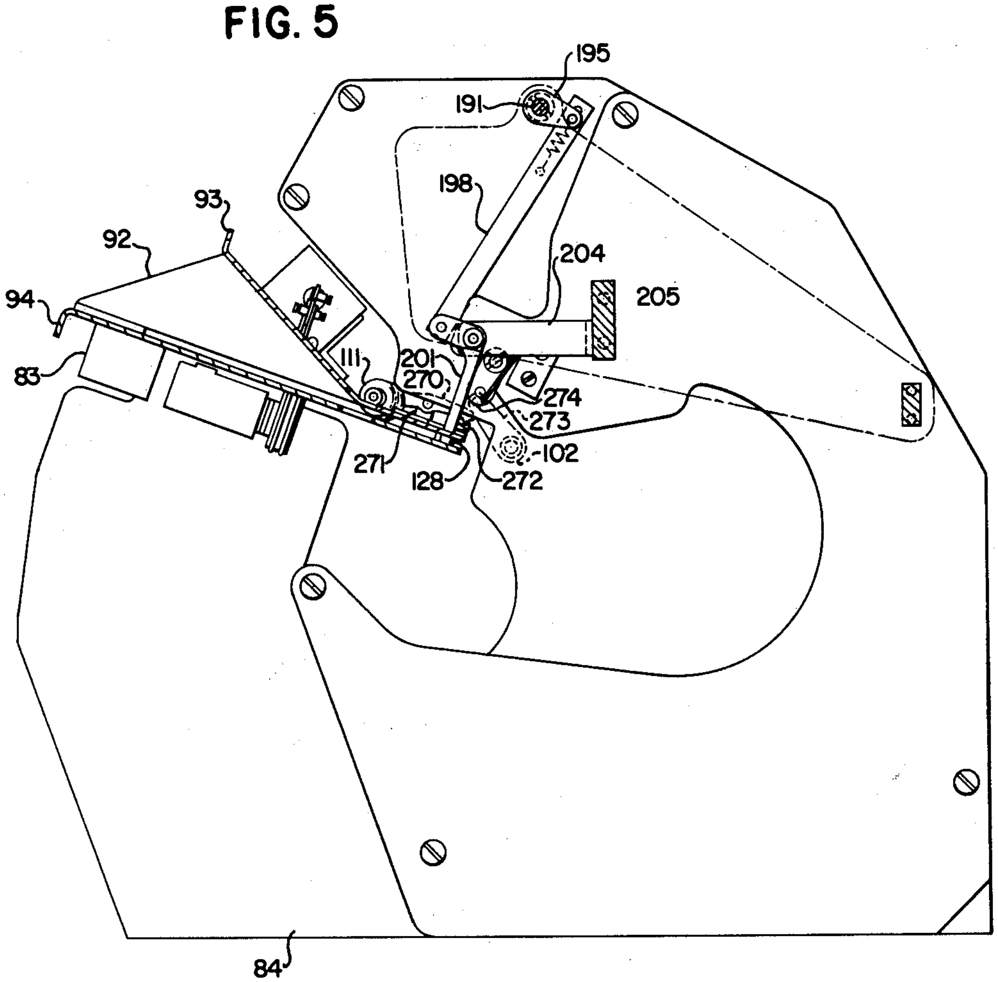
FIG. 5 is a sectional view taken along the line 5—5 of FIG. 3, showing an offset pressure roller and a bell crank arrangement of the print drop mechanism.

The pressure rollers 95 are rocked into engagement with their associated drive rollers by the energization of a pair of Eject solenoids 97 (FIGS. 3 and 4) and 98 (FIGS. 14 and 20). The solenoid 98 controls the pressure rollers adjacent to the encoding mechanism, while the solenoid 97 controls the remainder of the pressure rollers. As shown in FIG. 4, the plunger 99 of the solenoid 97 is rotatably mounted to one end of a link 100 (FIG. 3), the other end of which is rotatably attached to a crank arm 101 secured to a shaft 102, which in turn is rotatably mounted within three supports 103 mounted on the feed bed frame 83.

Secured to the shaft 102 are a number of arms 104 (FIG. 3), each having a pair of studs 105, 106 located thereon. Rotatably mounted on the shaft 102 adjacent to the arms 104 is a lever support member 107, one end of which has mounted thereon the pressure roller 95. Mounted on the other end of the member 107 is a stud 108, to which is attached one end of a spring 109, the other end of which is attached to the stud 105. The spring 109 acts to bias the support member 107 in a clockwise direction about the shaft 102 as viewed in FIG. 4. This movement of the support member is limited by engagement of the support member with the stud 106.

The two pressure rollers 111 (FIG. 5) for the offset drive roller 87 (FIGS. 3 and 9), located on the left-hand side of the slip table, are each mounted to one end of a lever 270, which in turn is rotatably supported on a lever support member 271, located on the upper frame 93 of the slip table. The other end of the lever 270 has mounted thereto one end of a spring 272, the other end of which is supported by the upper frame 92. The spring 272 normally urges the pressure roller 111 counter-clockwise as viewed in FIG. 5, into engagement with its associated feed roller 87. An arm 273, secured to the shaft 102 and having a stud 274 mounted on its end, will, when the shaft is rotated clockwise as viewed in FIG. 4 by operation of the solenoid 97, be rotated counter-clockwise (FIG. 5), allowing the stud to engage one end of the lever support member, thereby rocking the pressure rollers 111 counter-clockwise out of engagement with their associated drive rollers.

Rotation of the shaft 102 is limited by a stop member 110 (FIG. 4), secured to a support 18, which in turn is secured to a support member 19, mounted between the side frames 84 (FIG. 3). Counter-clockwise rotation of the arm 101 engages the stop member 110, as shown in FIG. 4, thereby limiting the rotation of the shaft 102. With this construction and with the shaft 102 being in the position shown in FIG. 4, the pressure rollers 111 for the offset drive wheels 87 will be in engagement with their associated drive wheels, while the other pressure rollers 95 will be in the position shown in FIGS. 3 and 4.

As previously disclosed, the second set of pressure rollers 95, 111, located adjacent to the encoding mechanism, are controlled by the solenoid 98 (FIGS. 14 and 20), mounted on the upper frame 93 of the slip table 92. The plunger 112 of the solenoid 98 is attached to a slide 113, having an elongated slot 114. The slide 113 is slidably supported on a stud 115 positioned within the slot and mounted on a support member 116 located on the upper frame 93.

Located adjacent the end of the slide 113 is another support member 117, which rotatably supports an arm 118, one end of which supports the pressure roller 95. The other end of the arm 118 has a stud 119, to which is attached one end of a spring 120, the other end of which is secured to a stud 121 mounted on the lever 113. Energization of the solenoid 98 moves the lever 113 to the right, as viewed in FIG. 20, thus rocking the arm 118 and its associated pressure roller 95 clockwise into engagement with its associated drive wheel 86. In this operation, the spring 120 acts as a link, rotating the arm 118 as the slide 113 moves to the right.

A second pressure roller 95 is similarly mounted on the slide 113 inboard of the first pressure roller 95. Associated with this second pressure roller is an offset pressure roller 111, rotatably mounted on an arm 122, which in turn is mounted on a support member 123, to which the arm 118 of the second pressure roller 95 is mounted. At the top of the arm 122 is mounted the stud 124, which is connected by means of a spring 125 to a stud 126, mounted on a raised portion 127 of the slide 113. Upon energization of the solenoid 98, the raised portion 127 of the slide engages the stud 124, rocking the arm 122 clockwise, thereby raising the pressure roller 111 from engagement with the drive roller 87 (FIG. 3). This same operation rocks the other pressure roller 95 into engagement with its associated drive roller in the manner previously described above with regard to the first pressure roller 95.

When the operator inserts the record medium to be encoded into the throat of the slip table, the medium is engaged by the offset drive and pressure rollers 87, 111, which transport the medium into engagement with a back rail 128 (FIG. 4) located at the rear of the throat. The medium is moved along the rail into the encoding area, where it is positioned, depending on the field or fields to be encoded that were programmed by the operator. As shown in FIG. 3, there are located above the slip table four media stop assemblies, 129, 130, 131, and 132, which, when actuated, position a stop member 133 through a cut-out 134 (FIG. 14) located in the slip table to position the media for an encoding operation in a predetermined field. The stop assembly 129 positions the medium so that the encoding will occur in the Amount field, stop assembly 130 in the Account Number field, the stop assembly 131 in the FR-ABA Transit Number field, and the stop assembly 132 in the Serial Number field.

Figures 6, 7:
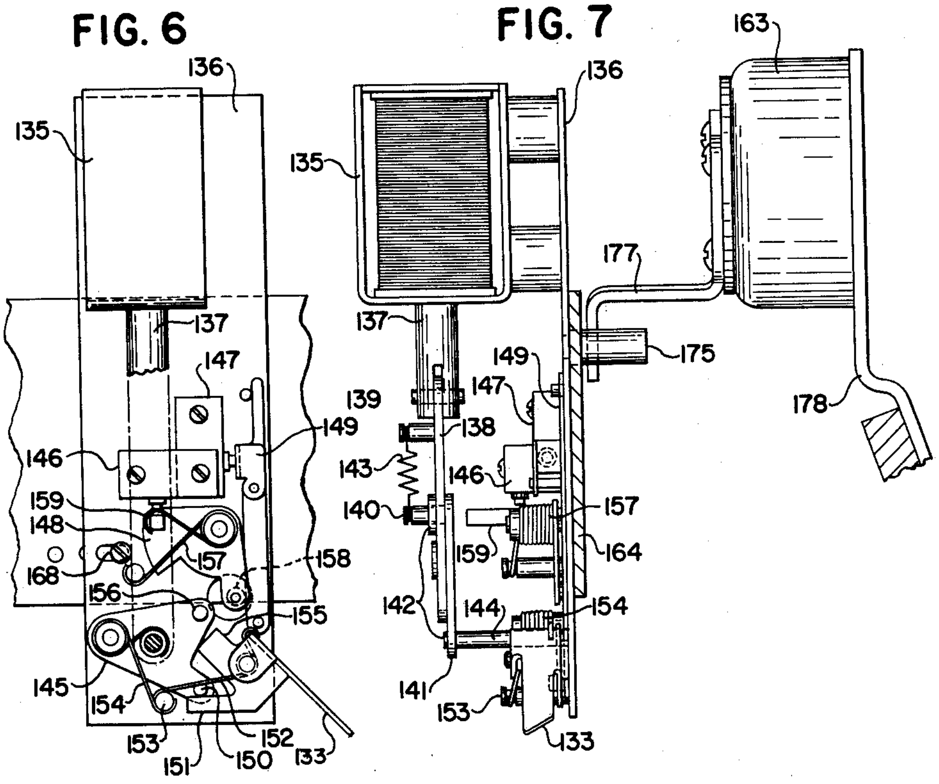
FIG. 6 is a front detailed view of the amount stop assembly.
FIG. 7 is a side detailed view of the amount stop assembly.

Referring now to FIGS. 6 and 7, there is shown an enlarged detailed view of the Account Number stop assembly 130. The remaining stop assemblies are of the exactly same construction. Each assembly consists of a drop solenoid 135 mounted on a rear support plate 136 and having a plunger 137. Pinned to the plunger is a link 138, having a stud 139 mounted thereon. The link 138 contains a slot 14 (FIG. 3), within which is positioned a stud 140, mounted on an extension member 141. A pair of clips 142, secured to the extension 141, allow the extension 141 to slide along the link 138. A spring 143, mounted between the studs 139 and 140, acts as an elastic link between the link 138 and the extension 141.

Rotatably mounted on the lower end of the extension 141 is a stud 144, the other end of which is secured to an actuating arm 145, rotatably mounted on the rear support plate 136. Mounted adjacent the actuating arm 145 is the stop 133, while at the top of the rear support plate 136 is mounted a pair of switches 146 and 147. The switch 146 is classified as a Seal In switch and is associated with a switch-closing arm 148, rotatably mounted adjacent thereto, while the switch 147 is classified as an In Place switch and is provided with a release lever 149, similarly mounted. Upon the energization of the solenoid 135, the plunger 137 is retracted, resulting in the rocking of the actuating arm 145 counter-clockwise, as viewed in FIG. 6. A stud 150, mounted on the lower portion of the arm 145, normally engages a lower portion 151 of the stop member. Rotation of the arm 145 releases this interference, allowing the stop member to be rocked clockwise to a blocking position due to the action of a spring 152 mounted between the stud 153, located on the rear support plate 136, and the stop member. A spring 154, mounted between the stud 153 and the actuating arm 145, normally urges the arm 145 clockwise.

Rotation of the stop member 133 to a blocking position allows a stem portion 155 of the stop member to engage the release lever 149. This conditions the switch 147 to be released upon the engagement of the stop member by the document located in the slip table, as will be explained hereinafter.

The counter-clockwise movement of the actuating arm 145 allows a stud 156, mounted thereon, to engage the arm 148, thereby rotating the arm clockwise against the action of a spring 157. A stud 158, mounted on the arm 148, is removed from its normal engagement with the release lever 149, the lever now being held against the plunger of the switch 147 by the stem portion 155 of the stop member 133. A second stud 159, mounted on the upper portion of the arm 148, is moved into engagement with the plunger of the switch 146. This action closes the switch 146, which, as will be described hereinafter with relation to FIGS. 19A and 19B, completes a seal-in path to the solenoid 135.

At this point in the operation, the operator will have inserted the document to be encoded into the slip table, and the offset drive wheels 86 will have transported the document until it has engaged the stop member 133. When this occurs, the stop 133 is rotated counter-clockwise slightly, sufficiently to remove its stem 155 from engagement with the release arm 149 to allow the release arm to move clockwise under the action of a spring located within the switch. This action releases the plunger of the switch 147, closing the switch. As will be described more fully hereinafter, closing of the switch 147 completes a circuit to a relay which actuates a clutch mechanism 160 (FIG. 3) and initiates an encoding operation. Energization of the clutch couples a cam line shaft 161, supported between the side frames 84, to a drive wheel 162, which is driven by a timing belt (not shown). Mounted on the cam shaft 161 are a number of cams (FIGS. 10 to 13 inclusive), which control the operation of an associated switch. The function of these switches will be described in relation to the explanation of FIGS. 19A and 19B.

After the encoding operation has occurred, one of the cams located on the cam line actuates an associated switch to interrupt the energizing circuit to the solenoid 135. This action de-energizes the solenoid, resulting in the plunger 137 moving downwardly, thereby releasing the actuating arm 145 to the action of the spring 154. This restores the stop 133 to its non-blocking position and allows the spring 157 to rotate the switch-closing arm 148 to its home position, resulting in the opening of the switches 146 and 147. As will be described more fully hereinafter, with respect to FIGS. 19A and 19B, if any other informational fields are to be encoded, this occurs after the stop 133 has been restored to its non-blocking position. Under this condition, the document is moved until it engages the next stop member of the field to be encoded.

After the last informational field has been encoded, a cam on the cam line 161 operates to close a switch, which completes an energizing circuit to the Eject solenoids 97, 98, resulting in the document's being engaged by the pressure and feed rollers 86, 95, respectively. The document then is transported from the encoding apparatus to one of the two sort pockets 15 located in the storage bin 31.

Figure 8:
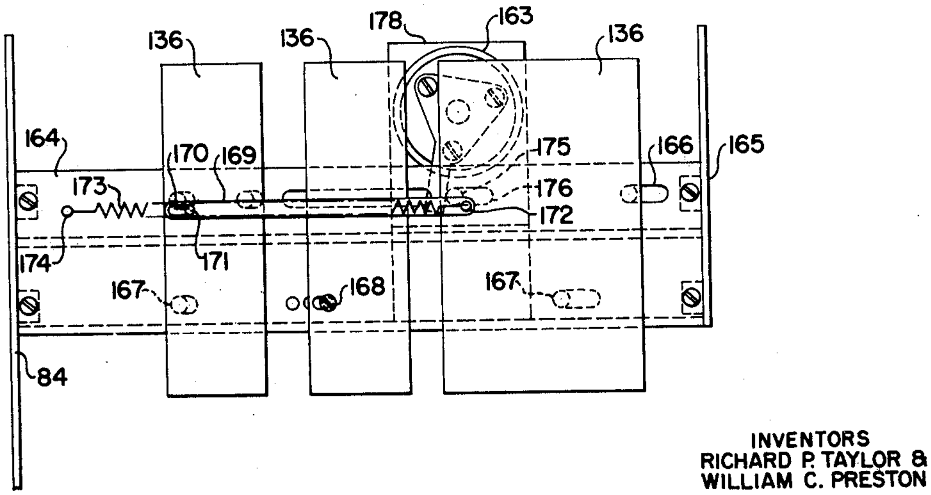
FIG. 8 is a plan view of the support plates for the various stop assemblies, showing details of the print shifting mechanism.

If the document to be encoded is a Continuous Form punched card 11, as shown in FIG. 16, the Serial Number and the FR-ABA fields are shifted as described previously. If the document has the amount already encoded and the Transaction Code is to be printed, the Transaction Code field is shifted one eighth of an inch to the left of normal position to remove the possibility of character overlap between the opening Amount field symbol and the last digit of the Transaction Code. Both of these conditions are controlled by the energization of the Shift solenoid 163 (FIGS. 7 and 8). As shown more clearly in FIG. 8, each of the stop assemblies 129 to 132 inclusive is mounted on a rear support plate 136, described previously. It will be seen that the stop assemblies for the FR-ABA field 131 and the Serial field 132 are mounted on a common rear support plate. Each of the rear support plates is slidably mounted on a support member 164, which in turn is mounted between the side frames 84 and 165. The support member 164 contains a number of slots 166, which accommodate studs 167 mounted on each of the rear support plates to allow the stop assembly to be shifted. Since the Account Number field is not required to move under these conditions outlined above, the rear support plate of the Account Number stop assembly 130 (FIGS. 6 and 8) is secured to the support mount 164 by means of a screw 168.

Mounted on the front of the rear support plate for the stop assemblies 129 and 131, 132 is a link 169, one end of which has an elongated slot 170, within which is positioned a stud 171, mounted on the Amount field support plate 136. The other end of the link is mounted to the Transit and Serial Number support plates by means of a stud 172. A spring 173 is also mounted to the stud 172, the other end being mounted to a stud 174, mounted on the support member 164.

Secured to the rear of the support plate accommodating the FR-ABA Transit and Serial Number fields is a stud 175 (FIG. 7), which extends through an elongated slot 176 located in the support member 164. Engaging the stud 175 is one end of an actuating arm 177, the other end of which is mounted to the drive shaft of the solenoid 163. The solenoid is mounted to a support frame 178 of the machine. Upon energization of the solenoid 163, the arm 177 is rotated counter-clockwise, as viewed in FIG. 8, thereby sliding the rear support plate 136 of the stop assemblies 131 and 132 (FIG. 3) to the right, the distance being determined by the slot 176. Since the encoding unit remains stationary, the effect of the movement of the stop to the right is to shift the encoding fields on the document to the left. This movement of the rear support plate is against the action of the spring 173. The stop assembly 129 is also moved to the right by the action of the link 169, but this latter movement is only one eighth of an inch, due to the length of the elongated slot 170. When the solenoid 163 is de-energized, the stop assemblies are returned to their home positions by the action of the spring 173.

Where the document to be encoded consists of a punched card of the type disclosed in FIGS. 16, 17, and 18, certain of the encoding fields have to be located below the nine's row, as disclosed previously. This condition is controlled by the energization of the Drop solenoid 179 (FIG. 3 and FIG. 4), mounted to the side frame 84 by means of studs 180 (FIG. 3). The plunger 181 of the solenoid 180 is connected to a link 182 by means of a stud 183, positioned within an elongated slot 184 located in the link. This connection allows the link to slide in a reciprocating movement. The lower end of the link is rotatably connected to one end of a bell crank 185, which is, in turn, rotatably mounted on a shaft 186 (FIG. 3) secured between the side frames 84. A spring 192, mounted between the bell crank and the stud 180, normally urges the bell crank counter-clockwise as viewed in FIG. 4.

The other end of the bell crank 185 has mounted thereon a cam follower 187, which engages the edge of a cam 188 under the urging of the spring 192. The cam 188 is secured to the cam shaft 161. During each operation of the cam line, the link 182 is reciprocated in an up-and-down movement by the action of the cam 188. Referring to FIG. 4, it is seen that the upper portion of the link 182 has a recessed portion 189, forming a hook. Mounted adjacent to this portion of the link is a lever 190, pinned to a shaft 191. Mounted on one end of the lever 190 is a guide 193, which coacts with the lever 190 to guide the top portion of the link 182 in its plane of movement. The other end of the lever 190 has connected thereto a spring 194, the other end of which is mounted to the stud 180 for normally urging the lever counter-clockwise to its home position.

Associated with the lever 190 is an arm 195, also pinned to the shaft 191. Mounted on the end of the arm 195 is a stud 196, which is positioned within an elongated slot 197, located at one end of a link 198. A spring 199 is secured between the stud 196 and a stud 200, mounted on the link 198, for urging the link to follow the movement of the arm 195. The lower end of the link 198 is rotatably mounted to one end of a bell crank 201, the other end of which extends through the throat 92 of the slip table. There are five other bell cranks 201 (FIG. 3), each of which is similarly mounted and operated by an associated arm 195 pinned to the shaft 191 in the manner described above. Four of the bell cranks are mounted on a support 204 (FIG. 5), which in turn is secured to a cross support 205, mounted between the side frames 84 and 125. The other two bell cranks are rotatably mounted on the stud 202 (FIG. 3) secured to the side frame 84. With this construction, energization, of the Drop solenoid 179 withdraws the plunger 181, thereby latching the hook portion 189 of the link 182 over a stud 203 mounted on the lever 190. Because of the movement of the link 182, as controlled by action of the cam 188, the lever 190 is rocked clockwise against the action of the spring 194. This movement is transmitted to the shaft 191, the arm 195, and the link 198, resulting in each of the bell cranks being rotated counter-clockwise (FIG. 4), thereby allowing their lower portions to engage the document located in the slip table and move it towards the front of the machine. This movement is sufficient to position the document so as to allow the encoding of the informational field to be made below the nine's rows on the punched card media, as explained previously.

Referring to FIGS. 19A and 19B, there is shown a schematic two-wire diagram of the controls for energizing the various solenoids used in the positioning of the document preparatory for an encoding operation. In initiating an operation of the apparatus, the operator moves the Mode toggle switch 80 on the Auxiliary Control Panel 29 (FIG. 2) to the Add and Encode position when the encoding apparatus is to be utilized. This position of the switch provides power to both the adding machine unit and the encoding unit.

Where the Amount and Transaction code and the FR-ABA Transit numbers are to be encoded on the document, the operator moves the Amount and FR-ABA Field Memory switches 53 (FIG. 2 to their ON position. Since operation of the Field Memory switches 53 requires a document to be fed through the apparatus to the storage bin, the first document to be processed after the machine is turned on requires that the Amount and FR-ABA Field Momentary switches 55 (FIG. 2) be moved to their ON positions. As will be described more fully hereinafter, the reason for this is that the Field Memory switches 53 are not activated when the switches are thrown but are conditioned to be activated. This latter condition occurs upon a document's operating a switch in the exit chute of the encoding unit. Use of the Momentary switches at this time results in the lowering of the appropriate stops. The Amount Momentary switch 55 is indicated in FIG. 19A as S100. This switch has two sets of contacts; one set **206*a*, 206*b* are normally closed, while the other set 207*a*, 207*b* are normally opened. Upon movement of the switch to the ON position, the contacts 207*a*, 207*b* close to complete an energizing circuit to the Amount field stop assembly solenoid L150 (indicated as 135 in FIG. 6) from one side of the power supply line 208 over conductors 209, 210**, the normally closed contact SC150*b*1 of the In Place switch 147 (FIG. 6), the solenoid L150, the conductors **211*a*, 212*a*, the contacts 207*a*, 207*b* of switch S100, the conductor 212*b* to the other side of the power supply line 213. Energization of the solenoid L150** closes the contacts L150*ac*1 (FIG. 19A) and opens the contacts L150*bc*1.

As previously disclosed, energization of the solenoid L150 results in the Amount field stop member 133 (FIG. 6) being lowered to a blocking position and the closing of the Seal In Switch 146 (FIG. 4). Closing of the switch 146 completes an additional energizing circuit to the solenoid L150 over conductors 211 and **212*a*, the normally closed contacts 206*a*, 206*b* of the Momentary switch S100, which contacts remain closed when the switch is moved to its ON position, conductor 214**, the now-closed contacts L150*ac*1 of the switch 146, and conductor **212*b* to the power line 213. It should also be noted that the solenoid L150 is energized by an additional circuit, which by-passes the In Place switch 147. This circuit is completed from the power line 208 over conductor 209**, normally closed contact SC300*bc*1 of the cam switch SC300, the conductor 215, through the diode 216 to the solenoid L150. Each of the other field solenoids is energized in the same manner. As shown in FIG. 19A, the Account Number field solenoid is indicated as L151, the FR-ABA Transit Number field solenoid as L152, and the Serial Number field solenoid as L153.

Figure 10:
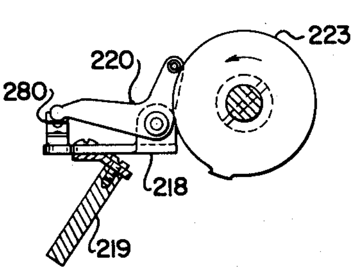
FIG. 10 is a side detailed view of the Eject cam operated switch assembly.
Figures 11, 12:
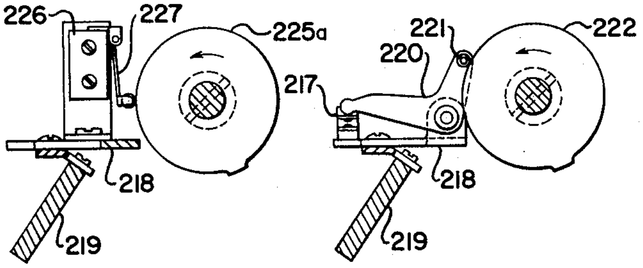
FIG. 11 is a side detailed view of the Scan Control cam operated switch assembly.
FIG. 12 is a side detailed view of the Stop Up cam operated switch assembly.
Figure 13:
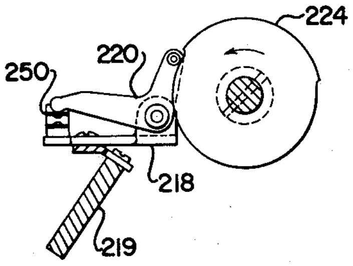
FIG. 13 is a side detailed view of the Print cam operated switch assembly.

The cam switch SC300 is indicated in FIG. 12 as 217. The switch is mounted on a switch support 218, which in turn is secured to a back frame 219 (FIG. 4) mounted between the side frames of the encoding apparatus. The switch 217 is actuated by one end of a bell crank 220 rotatably mounted on the switch support 218. The other end of the bell crank has mounted thereon a cam follower 221, which engages a cam 222 (FIG. 3) secured to the cam line shaft 161. The cam 222 transfers the contacts SC300*ac*1, SC300*bc*1 (FIG. 19A) between 215 degrees and 225 degrees of revolution of the cam line shaft. FIGS. 10 and 13 disclose control cams 223 and 224, respectively, which have a switch arrangement similar to the cam 222. The cam 223 transfers its switch contacts SC301 (FIG. 19A) between 250 and 260 degrees of revolution of the cam line, while the cam 224 transfers its contacts SC303 (FIG. 19A) between 5 degrees and 145 degrees. Control cam **225*a* (FIG. 11) actuates a vertically-mounted switch 226 by actuating the switch arm 227 between five and ten degrees of revolution of the cam line shaft. The switch 226, when actuated, opens a circuit to a relay (not shown) for initiating an encoding operation after the actuation of the transaction code toggle switch 56 (FIG. 2) has occurred for a non-print condition. The function of the other control cams 222 to 224** inclusive will be described hereinafter.

After the Amount field stop member 133 has been lowered to a blocking position, the operator enters the amount on the keyboard 21 (FIG. 2) of the adding machine unit. If the Transaction Code is to be encoded at this time the code may also be set up on the keyboard. A feature of the encoding mechanism is that a predetermined Transaction Code and FR-ABA Transit Number is automatically encoded by movement of the Auto ABA switch 59 (FIG. 2) to its ON position. The Transaction Code is automatically encoded whenever a transaction number is not set up on the keyboard. In the present example, it is assumed that the transaction code is set up on the keyboard, the last four banks of keys on the left-hand side of the keyboard 21 (FIG. 2) being used for this purpose. Depending on the nature of the document to be encoded, either the "Checks" motor key 49 or the "Deposit" motor key 50 (FIG. 2) is depressed, resulting in the cycling of the adding machine. As disclosed more fully in the previously-cited United States patent to Preston et al., No. 2,935,935, the amount and the transaction code are transferred from the keyboard of the adding machine to the encoding unit. The Encode indicator lamp 78 (FIG. 2) on the Auxiliary Control panel lights to indicate that the adding machine has cycled and that a document can be processed to the encoding unit. The operator then places a document on the slip table, and automatically the document is carried by the drive and pressure rollers 87, 111 (FIGS. 3 and 5) against the Amount stop member 133, thereby transferring the contacts SC150*a*1, SC150*b*1 (FIG. 19A) of the switch 147 in the manner described previously. Opening of the contacts SC150*b*1 interrupts the original energizing circuit to the solenoid L150, which is now energized by the circuit through the cam-operated switch contact SC300*bc*1.

The closing of contacts SC150*a*1 of the switch 147 completes an energizing circuit to the relay K206 over conductors 215, 225, and **212*b* to the power line 213. Energization of the relay K206 closes a contact K206 (FIG. 19B), which completes an energizing circuit to the Printer Trip Clutch solenoid L300 (indicated as 160 in FIG. 3). This energizing circuit to the clutch solenoid L300 is completed from the power line 210, the contacts K219, which are now closed due to the operation of the adding machine, over one of the contacts 229 of a rotary switch SR61A located in the adding machine, the contacts 229 indicating the function of the last operation of the adding machine as controlled by the various motor keys 42 to 52 (FIG. 2), a conductor 230, the closed contacts K206, the solenoid L300, the now-closed contacts SC309 of the Ribbon Tension switch to the power line 213. The function of the rotary switch SR61A is to insure a proper sequence of operation, while the Ribbon Tension switch SC309 insures that a supply of magnetic ribbon is available for the printing hammers of the encoder. The contacts 229*a* of the switch SR61A, to which the remaining contacts K207, K210, and K213, representing, respectively, the Account Number, FR-ABA, and the Serial fields, are connected, represent an operation of the adding machine initiated by the number key 51 (FIG. 2). Energization of the Printer Trip Clutch solenoid L300 couples the drive motor (not shown) of the encoding apparatus to the cam line 161** (FIG. 3).

During the operation of the cam line, the Amount and the Transaction code are encoded on the document. This encoding operation is initiated by actuation of the switch 250 (FIG. 13) by the cam 224. This occurs at five degrees of revolution of the cam line. At 215 degrees of revolution of the cam line, the Stops Up cam 222 (FIG. 12) actuates an associated switch 217, opening the switch contact SC300*bc*1 (FIG. 19A), thereby interrupting the energizing circuit to the amount solenoid L150. The deenergization of the Amount solenoid L150 results in the transferring of the switches 146, 147 to their original positions in the manner described previously.

At 250 degrees of revolution of the cam line, the Eject cam 223 (FIG. 10) actuates its associated switch 280, thereby closing contacts SC301 (FIG. 19A). This operation normally would complete a circuit to the Eject solenoids L304, L305 indicated as 97 (FIGS. 3 and 4) and 98 (FIGS. 14 and 20), respectively, energization of which results in the drive and pressure rollers 86, 95 (FIG. 3) engaging the document for transporting the document to the sorting bin, as described previously. This circuit is normally completed from the power line 210 over the closed contacts SC351, which are controlled by a switch located in the sorting bin 31 (FIG. 1), which will be described more fully hereinafter, over conductor 231, the normally closed contacts **232*a*, 232*b* of the Manual Eject switch 75 (FIG. 2), the conductor 233, the normally closed contacts K214, the normally closed contact K215 controlled by a jam detector switch (not shown) located in the sorting bin, the solenoids L304 and L305, the normally closed contacts SC354 and SC355 controlled by other jam detector switches located in the pockets of the sorting bin, to the power line 213. Reference should be made to the previously-cited United States patent to Bennett et al., No. 3,100,113, which discloses jam detector switches 156 (FIG. 1) in the pockets of the storage bin. These switches are the same type used in the present apparatus as jam detector switches and as exit switches. In the latter application, the exit switches are located in the feed chute indicated as 103** (FIG. 1) in the Bennett patent. The contacts of the exit switches are closed by a document's passing through the feed chute on its way to the storage bin. The jam detector switches are momentarily opened by a document's being inserted into either of the pockets of the storage bin. Closing of these contacts after the document has been stacked in the sorting bin allows the energization of the solenoids L304, L305 to be completed.

Energization of the solenoids L304, L305 results in the document's being transported to the sorting bin, during which time the document trips an exit switch (not shown), thereby opening its associated contact SC351 (FIG. 19A), resulting in the opening of the energizing circuit to the solenoids L304, L305, as described above.

In the present example, the document has been programmed to print, in addition to the Amount and the Transaction code, the FR-ABA Transit Number. In order that this latter field may be encoded, the energizing circuit to the Eject solenoid L304, L305 must be temporarily disabled. This is accomplished by the opening of the contact K214 in the Eject solenoid's energizing circuit. As shown in FIG. 19A, a relay K214 is energized upon the closing of the Seal In switch 146 of any of the information fields. As described previously, the closing of the switch 146 occurs when the stop member 133 is moved to a blocking position. The energizing circuit is completed from the power line 210, the closed contacts SC351, conductor 234, the closed contacts 235*a*, 235*b* of the Manual Eject switch 75, the conductors 236, the relay K214, the conductors 237, 238, the diode 281, any of the contacts L150*ac*1 to L153*ac*1 inclusive of the Seal In switch 146 of any of the informational fields, to the power line 213. Energization of the relay K214 opens the contact K214 in the Eject solenoids L304, L305 energizing circuit. Thus the document is still engaged by the offset drive and pressure rollers 86, 111 (FIGS. 9 and 14) in the manner described previously.

Upon the withdrawal of the Amount Field stop, the document moves into engagement with the FR-ABA Transit Number field stop, where the encoding of the number occurs in the same manner described above for the Amount number. Upon the de-energization of the solenoid L152 by operation of the cam switch 217 due to action of the Stops Up cam 222 (FIG. 12), the Transit Number field stop 133 is withdrawn, thereby opening the contacts L152*ac*1 of the Seal In switch 146. This interrupts the K214 relay energizing circuit, thereby closing the contact K214 in the Eject solenoid energizing circuit. Energization of the Eject solenoids L304, L305 transfers control of the document in the printing position to the drive and pressure rollers 95, 86 (FIGS. 9, 14, and 20), which transport the document out of the encoding area to the sorting bin.

As described above, with respect to the cited Bennett et al. United States patent, No. 3,100,113, an exit switch similar to the switch 156 (FIG. 1) is located in the guide chute. This switch is actuated by the document, which results in the opening of contact SC351 in the Eject solenoids' circuit, thereby de-energizing the solenoids, as explained previously. Actuation of the exit switch also closes contacts SC353, shown in FIG. 19A. The operation of the exit switch is of momentary duration. The switch returns to its home position as soon as the document has passed. Thus the contacts SC351 and SC353 transfer momentarily, the contacts SC351 returning to the normally closed position, while the contacts SC353 return to the open position. The contact SC353 is shown connected in series to a number of switch contacts closed by the actuation of the Field Memory switches 53 (FIG. 6). As shown, the contacts S109*a*, S109*b* are closed by the Serial Field memory switches, S110*a*, S110*b*, by the FR-ABA Transit Number field memory switch, S111*a*, S111*b*, by the Account Number field memory switch S112*a*, S112*b*, and by the Amount Field memory switch. Each of these switches is connected over conductor 239 to its associated Stop solenoid L150 to L153 inclusive. It will be seen that this arrangement transfers energizing of the Stop solenoids 135 (FIG. 6) of each field from the control of the Momentary switches 55 to the Field Memory switches 53. To return each of the Field Memory switches to their home position, the operator is required to do this by manual operation.

Upon the momentary closing of the contact SC353 of the exit switch by the first encoded document, an energizing circuit is completed to the stop solenoid of each informational field that has an associated field memory switch 53 in a closed position. This circuit is completed from the power line 208, conductor 209, 210, the closed contact of the In Place switch 147 of the field selected, the stop solenoid of the field, the conductors 211, 239, a diode 239*a*, the particular field memory switch contacts which have been closed by actuation of said switch, the closed contacts SC353 of the exit switch, to the power line 213. This energizing circuit results in lowering of each field stop so selected. By this time, the contacts SC353 have opened, thereby interrupting the original energizing circuits to the various stop solenoids, which solenoids remain energized by a circuit through its own In Seal switch 146 in the manner described previously. After the encoding operation has been completed, the document is transported to the sorting bin 31, during which time the exit switch is closed. This results again in the closing of the contacts SC353, resulting in the energization of all the field stops that have been programmed by the actuation of the field memory switches 53. Thus each succeeding document is automatically programmed for the encoding of information in the selected fields. In the example described here, these fields are the Amount and FR-ABA Transit Number fields.

It will be seen from this construction that any combination of the four informational fields can be programmed for encoding on a number of documents. If, during the encoding operation, one of the documents is discovered to have already encoded an informational field that has been programmed by the actuation of the particular field memory switch 53, movement of the appropriate Momentary switch 55 to the OFF position opens the contacts 206*a*, 206*b* (FIG. 19A) of the switch 55. This interrupts the energizing circuit to the stop solenoid of that field, resulting in the field stop member 133 being withdrawn, thus allowing the document to be transported to the next field stop to initiate the encoding operation of the next informational field.

In the event that the same informational field is to be encoded on a large number of documents, the operator may initiate an encoding operation in the manner described above. In addition, the operator will move the Repeat Print switch 73 (FIG. 2) to the ON position. This action locks up the encoding mechanism with the information from the adding machine. For any subsequent encoding operation, the adding machine cycle is eliminated, the operator merely inserting the document in the chute 30 (FIG. 2), where, upon engaging a field stop, it will initiate an encoding operation in the manner described previously. In the Printer Trip Clutch solenoid L300 energizing circuit (FIG. 19B), the K219 contact must be by-passed, since no adding machine cycle is included in this operation. This is accomplished by the contact ST153, closed by the actuation of the Repeat Print switch 73, which provides an energizing circuit to the clutch solenoid L300 over conductors 240 or 230, depending upon the field selected.

In the case where a document becomes jammed in the feed chute during an encoding operation or for any other reason, the operator may clear this condition by depressing the Eject switch 75 (FIG. 2), which action transfers the contacts 236*a*, 236*b* of the Eject switch S151 (FIG. 19A). This completes an energizing circuit to the Eject solenoids L304, L305 from the power line 210, over contact SC351 of the exit switch, conductor 234, the switch contacts 235*a*, 236*a*, 236*b*, 236*c*, conductor 234*a*, the diode 237*a*, the solenoids L304, L305, and the contacts SC354, SC355 to the power line 213. Energization of the solenoids L304, L305 results in the ejection of the record media in the manner described previously.

Where a short card document of the type disclosed in FIG. 18 is to be encoded, only the Amount and the Transaction Code and the FR-ABA Transit Number can be encoded. In this arrangement, the Transit Number is encoded in the normal location of the Account Number and is also encoded below the nine's row. As part of this operation, the operator moves the Short Card switch 61 (FIG. 2) to the ON position. This switch is shown in FIG. 19B and is indicated as S107, and its function is to control the energization of the solenoids 179 (FIG. 4). In the ON position, contacts 241*a*, 241*b* will close, completing an energizing circuit to the relays K200, K201 from the power line 210 over the normally closed contacts SC351 of the exit switch, conductor 242, the relays K200, K201, over the closed contacts 243*a*, 243*b*, conductor 244, diode 245, the closed contacts 241*a*, 241*b*, conductors 246, 247 to the power line 213. Energization of the relay K200 closes an associated contact K200, which completes a seal in circuit to the relays over the contacts 243*a*, 243*b*, conductor 244, the closed contacts K200, the conductors 246, 247 to the power line 213. The energization of the relay K200 also closes a contact K200 (FIG. 19A), which conditions an energizing circuit to the Drop Print solenoid 179 (FIG. 4), indicated as L303 in FIG. 19A. This circuit will be described hereinafter.

Operation of the Short Card switch 61 also results in the automatic lowering of the Account Number field stop 133 to a blocking position This is accomplished by an energizing circuit's being completed to the Account Number stop solenoid L151 (FIG. 19A) from the power line 208, over conductors 209, 210, the normally closed contact SC151*b*1 of the In Place switch 147, the solenoid L151, conductors 239 (FIG. 19A), conductors 248 (FIGS. 19A and 19B), diode 249, the closed contacts 241*a*, 241*b* of the Short Card switch 61, and conductors 246, 247 to the power line 213. The energization of the stop solenoid L151 moves its associated field stop 133 to a blocking position in the manner described previously.

When the Short Card document engages the Account Number field stop, the In Place switch 147 transfers, and a circuit is completed to the Account Number relay K207 over the contacts SC151*a*1, conductor 225, diode, 282, conductor 214, and contacts L151*ac*1, which closes an associated contact K207 (FIG. 19B) to condition an energizing circuit to the Printer Trip Clutch solenoid L300. This energizing circuit is completed upon the closing of the contact 219 as the result of the operation of the adding machine as previously described. The adding machine is used at this time to enter the FR-ABA Transit Number into the encoding mechanism.

Energization of the Printer Trip Clutch solenoid L300 results in the coupling of the cam line 161 to the drive motor of the apparatus. At five degrees of revolution of the cam line, the switch 250 (FIG. 13) is closed by the operation of the cam 224. This completes an energizing circuit to the Drop Print solenoid 179 (FIG. 4), indicated as L303 in FIG. 19A, which circuit is completed from the power line 208, conductors 209, 210, the closed contacts SC303 of switch 250, the solenoid L303, the normally closed contacts K206 controlled by the Amount relay K206, conductors 251, 252, the now-closed contact K200, conductors 253, diode 254, conductors 214, and the now-closed contact L151*ac*1 of the Account Number Seal In switch 146 to the power line 213. As previously described energization of the Drop Print solenoid results in the rocking of the bell cranks 201 (FIG. 4), moving the document forward so as to allow the encoding of the Transit Number below the nine's row of the punched card.

At 145 degrees of revolution of the cam line, the contacts SC303 of the switch 250 open, thereby de-energizing the solenoid L303. At 215 degrees of revolution, the contact SC300*bc*1 opens, de-energizing the Account Number stop solenoid L151. At 250 degrees of revolution, the contacts SC301 (FIG. 19A) close, thereby energizing the Eject solenoids L304, L305, resulting in the document's being transported to the sorting bin, during which the contacts SC351 (FIG. 19B) of the exit switch are open, thereby de-energizing the relays K200, K201. This returns the apparatus to its home position, ready for the next encoding operation.

Where the document is a punched card of standard length (FIG. 17), all the informational fields except the Amount field are encoded below the nine's row. This is accomplished by moving the Standard Punched Card switch 63 (FIG. 2) to the ON position. This switch is indicated as S105 in FIG. 19B. Actuation of this switch results in the closing of contacts 255*a*, 255*b*, thereby completing an energizing circuit to the relay K204 from the power line 210, the normally closed contact SC351, conductors 256, the relay K204, the normally closed contacts 257*a*, 257*b*, the now-closed contacts 255*a*, 255*b*, and conductors 258, 247 to the power line 213.

Energization of the relay K204 closes contacts K204 (FIG. 19A), resulting in the energization of the Drop Print solenoid L303 over the conductors 251, 259, the now-closed contact K204, to the power line 213. Energization of this solenoid results in the positioning of the document in the manner described above. After the encoding of the fields has taken place, the document is ejected as described above, resulting in the opening of the contacts SC351 of the exit switch, thereby de-energizing the relay K204.

If the document is a Continuous Form punched card (FIG. 16), the Account Number and the Transit Number are encoded below the nine's row in the same manner as described above. As part of the same operation, the Transit Number and the Serial Number are encoded seven-sixteenths of an inch to the left of their normal field printing position. This is accomplished by moving the Continuous Form punched card switch 65 (FIG. 2), indicated as S106 in FIG. 19B, to the ON position, thereby closing the contacts 260*a* and 260*b*. Closing of the contacts 260*a*, 260*b* completes an energizing circuit to the relay K202 from the power line 210, the closed contacts SC351 of the exit switch, the relay K202, the now-closed contacts 260*a*, 260*b*, the conductors 258, 247 to the power line 213. It should be pointed out that each of the switches S105, S106, and S107 is of the Momentary type, the switch contacts returning to their home position after the first operation of the apparatus. However, the relays K200, K201, K202, and K204 remain energized by a circuit completed over an associated contact K201, K200, K202, and K204 (FIG. 19B), which are closed upon the energization of its associated relay.

Energization of the relay K202 also closes a contact K202 (FIG. 19A) in the Drop Print solenoid L303 (FIG. 19A) energizing circuit. This circuit is completed through either the Seal In switch 146 of the Account Number field (through contacts L151*ac*1) or the Transit Number field (contacts L152*ac*1) in the manner described previously. Thus, when the encoding takes place in either of these fields, the document is positioned for encoding below the nine's row.

Energization of the relay K202 also closes another contact K202 in the Shift Print solenoid L302 (FIG. 19A) energizing circuit, which solenoid is indicated as 163 in FIGS. 6, 7, and 8. This circuit is completed from the power line 208 over conductors 209, 210, 261, the Shift Print solenoid L302, the now-closed contact K202, the normally closed contact L151*bc*1 of the Account Number Seal In switch 146, conductor 262, the normally closed contacts L150*bc*1 of the Amount Field Seal In switch 146, and conductor 212 to the power line 213. It is seen from this arrangement that the solenoid L302 is energized only when the Amount stop solenoid L150 and the Account Number stop solenoid L151 are not energized. This insures that only the Transit Number and the Serial Number will be encoded to the left of their normal printing positions.

After the encoding of the fields has occurred, the document is ejected in the manner described previously, which results in the opening of contacts SC351 of the exit switch, thereby de-energizing the relays K202 and K204. The encoding apparatus is now ready for the next operation.

While there have been shown, described, and pointed out the fundamental novel features of the invention as applied to the preferred embodiment, it will be understood that various omissions, substitutions, and changes in the form and details of the device illustrated and its operation may be made by those skilled in the art without departing from the spirit of the invention. It is the intention, therefore, to be limited only as indicated by the scope of the following claims.

What is claimed is:

1. An encoding apparatus comprising
(a) an encoding mechanism settable in accordance with information to be recorded;
(b) first means for transporting a record media through a predetermined path towards said encoding mechanism;
(c) second means for transporting, when actuated, said record media through a predetermined path from said encoding mechanism to an exit in said apparatus;
(d) means for driving said apparatus through cycles of operation;
(e) a plurality of stop mechanisms mounted adjacent said predetermined path, each of said stop mechanisms including
(f) a stop member rotatably mounted on a support and normally positioned in a first position out of said predetermined path;
(g) electromagnetic means for rotating said stop member, when energized, to a blocking position in said predetermined path for intercepting and positioning said record media for encoding of information by said encoding mechanism in a predetermined field thereon;
(h) first switch means mounted adjacent said stop member and actuated by movement of said stop member to a blocking position;
(i) second switch means mounted adjacent said stop member and conditioned to be actuated upon movement of said stop member to a blocking position, said second switch means being actuated upon engagement of said stop member by said record media;
(j) a plurality of presettable control means, one for each stop mechanism, said control means energizing, when operated, the electromagnetic means whereby the associated stop member moves to its blocking position, thus actuating its first switch means;
(k) first cam means for de-energizing, when operated, the electromagnetic means of the stop mechanism engaged by the record media, whereby the associated stop member is moved to its first position;
(l) second cam means for disabling, when operated, said first transporting means and actuating said second transporting means;
(m) means controlled by the actuation of said first switch means of any of the stop mechanisms for disabling the control of said second cam means on the transporting means;
(n) and other means controlled by the actuation of said second switch means by the record media for operating said first and second cam means whereby the record media will be transported into engagement with each stop mechanism actuated by its associated control means for the encoding of information in a number of predetermined areas.

2. An encoding apparatus comprising
(a) an encoding mechanism settable in accordance with information to be recorded;
(b) first means for transporting a record media through a predetermined path towards said encoding mechanism;
(c) second means for transporting, when actuated, said record media through a predetermined path from said encoding mechanism to an exit in said apparatus;
(d) means for driving said apparatus through cycles of operation;
(e) a plurality of stop mechanisms mounted adjacent said predetermined path, each of said stop mechanisms including
(f) a stop member rotatably mounted on a support and normally positioned in a first position out of said predetermined path;
(g) electromagnetic means for rotating said stop member, when energized, to a blocking position in said predetermined path for intercepting and positioning said record media for encoding of information by said encoding mechanism in a predetermined field thereon;
(h) first switch means mounted adjacent said stop member and actuated by movement of said stop member to a blocking position;
(i) second switch means mounted adjacent said stop member and conditioned to be actuated upon movement of said stop member to a blocking position, said second switch means being actuated upon engagement of said stop member by said record media;
(j) a plurality of first presettable control means, one for each stop mechanism, said control means energizing, when operated, the electromagnetic means whereby the associated stop member moves to its blocking position, thus actuating its first switch means;
(k) a plurality of second presettable control means, one for each stop mechanism, said second control means energizing, when operated, the electromagnetic means of its stop mechanism;
(l) first cam means for de-energizing, when operated, the electromagnetic means of the stop mechanism engaged by the record media, whereby the associated stop member is moved to its first position;
(m) second cam means for disabling, when operated, said first transporting means and actuating said second transporting means;
(n) first means controlled by the actuation of said first switch means of any of the stop mechanisms for disabling the control of said second cam means on the transporting means;
(o) second means controlled by the actuation of said second switch means by the record media for operating said first and second cam means for the encoding of information in a number of predetermined areas.
(p) and switch means located in the exit of said apparatus for sensing the record media following the encoding of all the predetermined areas by operation of said first presettable control means, said switch means being actuated by the record media to operate each of the second control means for the encoding of the next record media.

3. An encoding apparatus comprising
(a) an encoding mechanism settable in accordance with information to be recorded;
(b) first means for transporting a record media through a predetermined path towards said encoding mechanism;
(c) second means for transporting, when actuated, said record media in a direction opposite to the movement of said first transporting means;
(d) means for driving said apparatus through cycles of operation;
(e) a plurality of stop mechanisms mounted adjacent said predetermined path, each of said stop mechanisms including
(f) a blocking member rotatably supported on a support, said blocking member being normally positioned out of said predetermined path;
(g) electromagnetic means for rotating said blocking member, when energized, to a position in said predetermined path for intercepting and position said record media for encoding of information by said encoding mechanism in a predetermined field thereon;
(h) first switch means mounted adjacent said blocking member and actuated by said blocking member when rotated to an intercepting position;

(*i*) second switch means mounted adjacent said blocking member and actuated by said blocking member when said blocking member intercepts a record media;

(*j*) a plurality of presettable control means, one for each stop mechanism, each of said control means energizing, when selected, its associated electromagnetic means, resulting in the blocking means' being rotated to an intercepting position;

(*k*) first cam means for de-energizing, when operated, the electromagnetic means of the stop mechanism engaged by the record media, thereby disengaging the blocking member from the record media;

(*l*) second cam means for disabling, when operated, said first transporting means and actuating said second transporting means;

(*m*) a drive member;

(*n*) means supporting said first and second cam means;

(*o*) means, when actuated, for coupling said supporting means to said drive member, whereby said first and second cam means are operated;

(*p*) relay means energized by the actuation of said first switch means of any of the stop mechanisms for disabling the control of said second cam means on said transporting means;

(*q*) and other means controlled by the actuation of said second switch means for actuating said coupling means whereby the record media will be transported into engagement with each stop mechanism selected by its associated control means for the encoding of information in a number of predetermined areas.

4. An encoding apparatus comprising (*a*) a keyboard;

(*b*) an encoding mechanism settable in accordance with information set up on the keyboard;

(*c*) a record media storage bin;

(*d*) a slip table mounted adjacent said encoding mechanism;

(*e*) guide means interconnecting said slip table with said storage bin;

(*f*) a first set of drive rollers for transporting a record media located on said slip table through a predetermined path towards said encoding mechanism;

(*g*) a second set of drive rollers for transporting, when actuated, said record media from the encoding mechanism to said storage bin through said guide means;

(*h*) means for driving said apparatus through cycles of operation;

(*i*) a plurality of stop mechanisms mounted adjacent said encoding mechanism for intercepting said record media at a predetermined position for encoding thereon by said encoding mechanism, each of said stop mechanisms including (*j*) a stop member rotatably mounted on a support and normally positioned out of said predetermined path;

(*k*) electromagnetic means for rotating said stop member, when energized, to a position intercepting said record media so as to allow said encoding mechanism to encode information in a predetermined field thereon;

(*l*) first switch means mounted adjacent said stop member and actuated by movement of said stop member to an intercepting position;

(*m*) second switch means mounted adjacent said stop member and conditioned to be actuated upon movement of said stop member to an intercepting position, said second switch means being actuated upon engagement of said stop member by said record media;

(*n*) a plurality of first presettable control means for determining which electromagnetic means of the stop mechanisms will be energized during the first cycle of operation;

(*o*) a plurality of second presettable control means for determining which electromagnetic means of the stop mechanisms will be energized during each succeeding cycle of operation;

(*p*) first cam means for de-energizing, when operated, the electromagnetic means of the stop mechanism engaged by the record media, thereby releasing said media for movement;

(*q*) second cam means for disabling, when operated, said first set of drive rollers and actuating said second set of drive rollers;

(*r*) means controlled by the actuation of said first switch means of any of the stop mechanisms for disabling the control of said second cam means on the first and second set of drive rollers;

(*s*) other means controlled by the actuation of said second switch means for operating said first and second cam means for encoding of the first record media;

(*t*) and switch means located on said guide means for sensing the record media following the encoding of all the predetermined areas on said record media, said switch being actuated by the record media to operate each of said second presettable control means for the encoding of each succeeding record media.

5. An encoding apparatus comprising (*a*) a keyboard;

(*b*) an encoding mechanism settable in accordance with information set up on the keyboard;

(*c*) means for transporting a record media through a predetermined path towards said encoding mechanism;

(*d*) means for driving said apparatus through cycles of operation;

(*e*) a plurality of stop mechanisms mounted adjacent said encoding mechanism for intercepting said record media at a predetermined position for encoding thereon by said encoding mechanism, each of said stop mechanism including (*f*) a first support member;

(*g*) a stop member rotatably mounted on said first support member and normally positioned out of said predetermined path;

(*h*) electromagnetic means mounted on said first support member for rotating said stop member, when energized, to a position intercepting said record media so as to allow said encoding mechanism to encode information in a predetermined field thereon;

(*i*) a second support member slidably supporting each of said first support members;

(*j*) means, when energized, for actuating one of said first support members a predetermined lateral distance;

(*k*) means interconnecting said actuated first support member with any of the remaining first support members whereby the stop mechanisms so connected are moved laterally a predetermined distance;

(*l*) a plurality of first presettable control means for determining which electromagnetic means of the stop mechanism will be energized during a cycle of operation;

(*m*) and a second presettable control means for energizing said actuating means to relocate on the record media the predetermined field of encoding controlled by each stop mechanism.

6. An encoding apparatus comprising (*a*) a keyboard;

(*b*) an encoding mechanism settable in accordance with information set up on the keyboard;

(*c*) a slip table mounted adjacent said encoding mechanism;

(*d*) means for transporting a record media along said slip table over a predetermined path towards said encoding mechanism;

(e) means for driving said apparatus through cycles of operation;
(f) a plurality of stop mechanisms mounted adjacent said encoding mechanism for intercepting said record media at a predetermined position for encoding thereon by said encoding mechanism, each of said stop mechanisms including
(g) a stop member rotatably mounted on a support and normally positioned out of said predetermined path;
(h) electromagnetic means for rotating said stop member, when energized, to a position intercepting said record media so as to allow said encoding mechanism to encode information in a predetermined field thereon;
(i) a plurality of positioning members, rotatably supported adjacent said encoding mechanism and said slip table for movement, when actuated transverse to said predetermined path to position said record media for an encoding operation;
(j) actuating means, when operated, for actuating said positioning members;
(k) cyclically operated driving means;
(l) a latch member connected to said drive means and normally disengaged from said actuating means;
(m) means, when energized, for latching said latch member to the actuating means for operation of said actuating means;
(n) a plurality of first presettable control means for determining which electromagnetic means of the stop mechanism will be energized during a cycle of operation;
(o) and a plurality of second presettable control means for energizing said latching means whereby said positioning member will be rotated to move said record member, when in an encoding position, transverse to its normal position.

7. An encoding apparatus comprising
(a) a keyboard;
(b) an encoding mechanism settable in accordance with information set up on the keyboard;
(c) means for transporting a record media through a predetermined path towards said encoding mechanism;
(d) means for driving said apparatus through cycles of operation;
(e) a plurality of stop mechanisms each slidably mounted adjacent said encoding mechanism for intercepting said record media at a predetermined position for an encoding operation by said encoding mechanism, each of said stop mechanisms including
(f) a support mounted for movement in a lateral direction;
(g) a stop member rotatably mounted on said support and normally positioned out of said predetermined path;
(h) electromagnetic means for rotating said stop member, when energized, to a position intercepting said record media so as to allow said encoding mechanism to encode information in a predetermined field thereon;
(i) means, when actuated, for moving each of said supports a predetermined lateral distance;
(j) a plurality of first presettable control means for determining which electromagnetic means of the stop mechanism will be energized during a cycle of operation;
(k) and a second presettable control means for actuating said moving means whereby the predetermined field of encoding of each stop mechanism is relocated on said record media.

8. An encoding apparatus comprising
(a) a keyboard;
(b) an encoding mechanism settable in accordance with information set up on the keyboard;
(c) a slip table mounted adjacent said encoding mechanism;
(d) means for transporting a record media along said slip table over a predetermined path towards said encoding mechanism;
(e) means for driving said apparatus through cycles of operation;
(f) a plurality of stop mechanisms mounted adjacent said encoding mechanism for intercepting said record media at a predetermined position for encoding thereon by said encoding mechanism, each of said stop mechanisms including
(g) a stop member rotatably mounted on a support and normally positioned out of said predetermined path;
(h) electromagnetic means for rotating said stop member, when energized, to a position intercepting said record media so as to allow said encoding mechanism to encode information in a predetermined field thereon;
(i) positioning means mounted adjacent said encoding mechanism and said slip table for movement transverse to said predetermined path, said positioning means, when actuated, engaging and positioning said record media for an encoding operation;
(j) means, when operated, for actuating said positioning means;
(k) a plurality of first presettable control means for determining which electromagnetic means of the stop mechanism will be energized during a cycle of operation;
(l) and a plurality of second presettable control means for operating said actuating means whereby said positioning means will engage and move said record media, when in an encoding position, transverse to its normal position to relocate the predetermined field of encoding controlled by each stop mechanism.

9. An encoding apparatus comprising
(a) a keyboard;
(b) an encoding mechanism settable in accordance with information set up on the keyboard;
(c) a record media storage bin;
(d) a slip table mounted adjacent said encoding mechanism;
(e) a first set of drive rollers for transporting a record media located on said slip table through a predetermined path towards said encoding mechanism;
(f) a second set of drive rollers for transporting, when actuated, said record media from the encoding mechanism to said storage bin through said guide means;
(g) means for driving said apparatus through cycles of operation;
(h) a plurality of stop mechanisms each slidably mounted adjacent said encoding mechanism for intercepting said record media at a predetermined position for an encoding operation by said encoding mechanism, each of said stop mechanisms including
(i) a support mounted for movement in a lateral direction;
(j) a stop member rotatably mounted on said support and normally positioned out of said predetermined path;
(k) electromagnetic means for rotating said stop member, when energized, to a position intercepting said record media so as to allow said encoding mechanism to encode information in a predetermined field thereon;
(l) first switch means mounted adjacent said stop member and actuated by movement of said stop member to an intercepting position;
(m) second switch means mounted adjacent said stop member and conditioned to be actuated upon movement of said stop member to an intercepting position, said second switch means being actuated upon engagement of said stop member by said record media;

(*n*) positioning means mounted adjacent said encoding mechanism and said slip table for movement transverse to said predetermined path, said positioning means, when actuated, engaging and positioning said record media for an encoding operation;

(*o*) first means, when operated, for actuating said positioning means;

(*p*) second means, when actuated, for moving each of said stop mechanisms a predetermined lateral distance;

(*q*) a plurality of first presettable control means for determining which electromagnetic means of the stop mechanisms will be energized during the first cycle of operation;

(*r*) a plurality of second presettable control means for operating said first means;

(*s*) a plurality of third presettable control means for actuating said second means;

(*t*) first cam means for de-energizing, when operated, the electromagnetic means of the stop mechanism engaged by the record media, thereby releasing said media for movement;

(*u*) second cam means for disabling, when operated, said first set of drive rollers and actuating said second set of drive rollers;

(*v*) means controlled by the actuation of said first switch means of any of the stop mechanisms for disabling the control of said second cam means on the first and second set of drive rollers;

(*w*) and other means controlled by the actuation of said second switch means for operating said first and second cam means whereby the location of the predetermined fields of encoding will be relocated from their original positions.

No references cited.